United States Patent
Baer et al.

(10) Patent No.: US 9,851,798 B2
(45) Date of Patent: Dec. 26, 2017

(54) ELECTRONIC DEVICE INCLUDING SPACED APART HALL EFFECT SENSOR BASED HAPTIC ACTUATOR DRIVING AND RELATED METHODS

(71) Applicant: Apple Inc., Cupertino, CA (US)

(72) Inventors: Richard L. Baer, Los Altos, CA (US); Arman Hajati, San Mateo, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/249,946

(22) Filed: Aug. 29, 2016

(65) Prior Publication Data

US 2017/0090574 A1 Mar. 30, 2017

Related U.S. Application Data

(63) Continuation-in-part of application No. 15/096,379, filed on Apr. 12, 2016.

(60) Provisional application No. 62/347,760, filed on Jun. 9, 2016, provisional application No. 62/329,353, filed on Apr. 29, 2016, provisional application No. 62/234,880, filed on Sep. 30, 2015.

(51) Int. Cl.
*H04B 3/36* (2006.01)
*G06F 3/01* (2006.01)

(52) U.S. Cl.
CPC .................... *G06F 3/016* (2013.01)

(58) Field of Classification Search
CPC .......... G06F 3/016; G08B 6/00; G09B 21/00; A61B 17/7016; A61B 17/07207; A61B 5/06; A61B 5/062

USPC ........ 340/407.1, 7.6, 965, 4.12, 856.4, 581, 340/683, 407.2
See application file for complete search history.

(56) References Cited

U.S. PATENT DOCUMENTS

| | | | | |
|---|---|---|---|---|
| 4,737,710 A | * | 4/1988 | Van Antwerp | G01D 5/147 324/207.2 |
| 4,897,582 A | | 1/1990 | Otten et al. | |
| 4,996,472 A | * | 2/1991 | Mallick, Jr. | H02H 7/001 324/546 |

(Continued)

FOREIGN PATENT DOCUMENTS

| WO | 2013169299 A1 | 11/2013 |
|---|---|---|
| WO | 2013169303 A1 | 11/2013 |

(Continued)

OTHER PUBLICATIONS

Product Specification Sheet: GEEPLUS, VIBRO1 Vibration Actuator, 2 pages, www.geeplus.biz, downloaded on Jul. 15, 2015.

*Primary Examiner* — Hoi Lau
(74) *Attorney, Agent, or Firm* — Allen, Dyer, Doppelt + Gilchrist, P.A.

(57) ABSTRACT

An electronic device may include a haptic actuator that includes an actuator housing, coils carried within the actuator housing, and a field member movable within the actuator housing responsive to the coils. The haptic actuator may also include spaced apart Hall Effect sensors carried within the actuator housing between the coils and for sensing a temperature of the field member. The electronic device may also include a controller coupled to the haptic actuator and configured to determine a temperature of the field member based upon the spaced apart Hall Effect sensors and drive the haptic actuator based upon the temperature.

22 Claims, 19 Drawing Sheets

(56) References Cited

U.S. PATENT DOCUMENTS

| | | | |
|---|---|---|---|
| 5,798,591 A * | 8/1998 | Lillington | H02K 3/04 |
| | | | 310/164 |
| 5,999,168 A | 12/1999 | Rosenberg et al. | |
| 8,169,402 B2 | 5/2012 | Shahoian et al. | |
| 8,287,522 B2 | 10/2012 | Moses et al. | |
| 8,350,484 B2 * | 1/2013 | Stanley | H05B 33/0818 |
| | | | 200/314 |
| 8,378,965 B2 | 2/2013 | Gregorio et al. | |
| 8,686,839 B2 | 4/2014 | Posamentier | |
| 2008/0191648 A1 | 8/2008 | Ito et al. | |
| 2009/0295380 A1 * | 12/2009 | Motz | G01R 33/072 |
| | | | 324/251 |
| 2011/0270188 A1 * | 11/2011 | Caffey | A61M 5/14526 |
| | | | 604/151 |
| 2012/0229264 A1 | 9/2012 | Company Bosch et al. | |
| 2013/0264973 A1 | 10/2013 | Garg et al. | |
| 2014/0070957 A1 | 3/2014 | Longinotti-Buitoni et al. | |
| 2014/0197936 A1 | 7/2014 | Biggs et al. | |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |
| 2016/0113683 A1 * | 4/2016 | Cheng | A61B 17/7016 |
| | | | 606/258 |
| 2016/0150824 A1 * | 6/2016 | Memari | A24F 15/12 |
| | | | 131/329 |
| 2016/0172136 A1 * | 6/2016 | McGaffey | H03K 17/97 |
| | | | 335/179 |
| 2017/0025974 A1 * | 1/2017 | Phan | H02K 11/215 |
| 2017/0090573 A1 * | 3/2017 | Hajati | G06F 3/016 |
| 2017/0090574 A1 * | 3/2017 | Baer | G06F 3/016 |

FOREIGN PATENT DOCUMENTS

| | | |
|---|---|---|
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

* cited by examiner

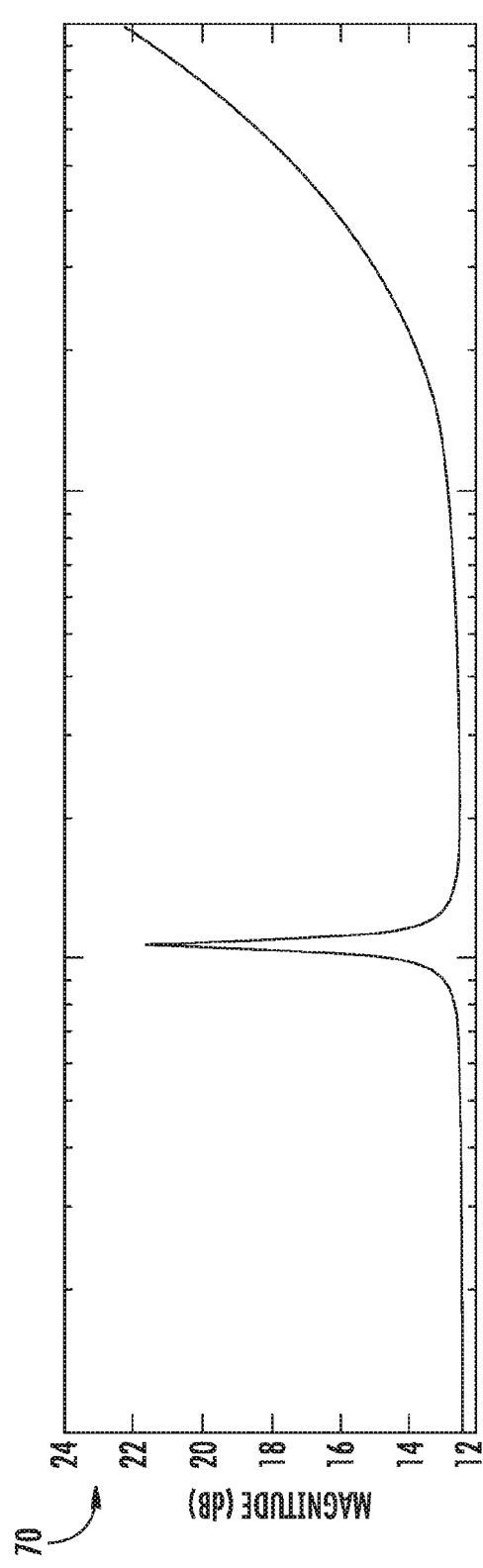
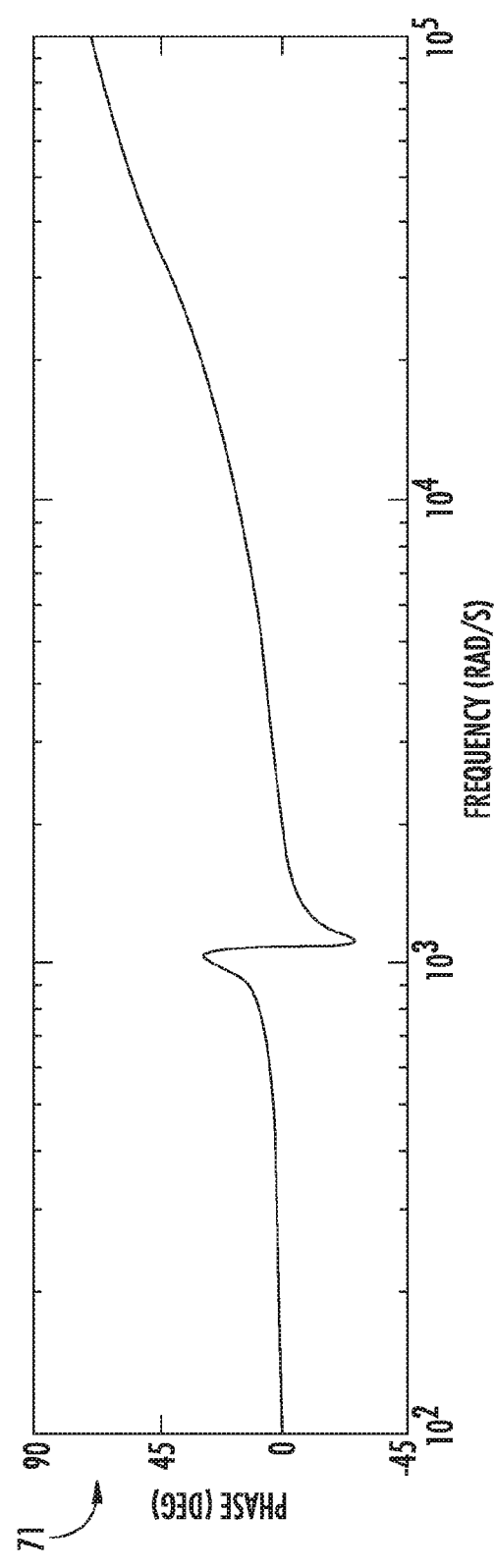
FIG. 4A
FIG. 4B

ELECTRONIC DEVICE INCLUDING SPACED APART HALL EFFECT SENSOR BASED HAPTIC ACTUATOR DRIVING AND RELATED METHODS

RELATED APPLICATION

The present application claims the priority benefit of provisional application Ser. No. 62/329,353 filed on Apr. 29, 2016, and 62/347,760 filed on Jun. 9, 2016, and is a continuation-in-part of application Ser. No. 15/096,379 filed on Apr. 12, 2016, which claims the priority benefit of provisional application Ser. No. 62/234,880 filed on Sep. 30, 2015, the entire contents of all of which are herein incorporated in their entirety by reference.

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

An electronic device may include a haptic actuator that includes an actuator housing, a plurality of coils carried within the actuator housing, and a field member movable within the actuator housing responsive to the plurality of coils. The haptic actuator may also include a plurality of spaced apart Hall Effect sensors carried within the actuator housing between the plurality of coils and configured to sense a temperature of the field member. The electronic device may also include a controller coupled to the haptic actuator and configured to determine a temperature of the field member based upon the plurality of spaced apart Hall Effect sensors and driving the haptic actuator based upon the temperature.

The controller may be configured to determine the temperature based upon an output resistance of the plurality of spaced apart Hall Effect sensors. The controller may include a closed-loop controller, for example.

The controller may be configured to sense a drive current of the haptic actuator, and drive the haptic actuator based upon the drive current. The controller may be configured to determine a calibration of the haptic actuator based upon drive current and the sensed temperature of the field member, and drive the haptic actuator in a closed-loop configuration based upon the calibration of the haptic actuator and at least one reference pattern of movement of the field member, for example.

The at least one reference pattern of movement may include a plurality of different reference patterns of movement, each corresponding to a desired one of a plurality of different operating modes of haptic feedback, for example. Each of the plurality of different reference patterns of movement may have a different drive waveform associated therewith.

The electronic device may further include a flexible circuit substrate carrying the plurality of spaced apart Hall Effect sensors within the actuator housing, for example. The controller may include a closed-loop controller configured to determine the temperature of the field member and an actuator driver carried within the actuator housing and configured to drive the haptic actuator based upon the temperature.

The electronic device may also include a power amplifier coupled between the controller and the haptic actuator. The electronic device may also include a position sensor configured to sense a position of the field member during movement thereof, and wherein the controller may be configured to drive the haptic actuator based upon the position of the field member.

A related method aspect is directed to a method of controlling a haptic actuator that includes an actuator housing, a plurality of coils carried within the actuator housing, a field member movable within the actuator housing responsive to the at least one coil. The method may include using a controller coupled to the haptic actuator for determining a temperature of the field member based upon a plurality of spaced apart Hall Effect sensors carried within the actuator housing between the plurality of coils and capable of sensing a temperature of the field member and driving the haptic actuator based upon the temperature.

A related device aspect is directed to an electronic device that may include a haptic actuator including an actuator housing, at least one first coil carried within the actuator housing, and at least one second coil carried within the actuator housing. The haptic actuator may also include a field member movable within the actuator housing between the at least one first and second coils and responsive thereto, and a plurality of spaced apart Hall Effect sensors carried within the actuator housing between the at least one first and second coils and configured to sense motion of the field member. The electronic device may also include a controller coupled to the haptic actuator and configured to drive the haptic actuator based upon the sensed motion of the field member from the plurality of spaced apart Hall Effect sensors.

BRIEF DESCRIPTION OF THE DRAWINGS

FIGS. 4a and 4b are bode diagrams of frequency versus magnitude and frequency versus phase, respectively for a haptic actuator in accordance with an embodiment.

FIG. 5b is a graph of exemplary tap momentum corresponding to the drive waveform of FIG. 5a.

FIG. 6b is a graph of expected and observed displacement and velocity corresponding to the drive waveform of FIG. 6a.

FIG. 7b is a graph of expected and observed displacement and velocity corresponding to the drive waveform of FIG. 7a.

FIG. 8b is a graph of displacement and velocity corresponding to the drive waveform of FIG. 8a.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and elements in increments of 100 are used to indicate similar elements in alternative embodiments.

Figure 1:
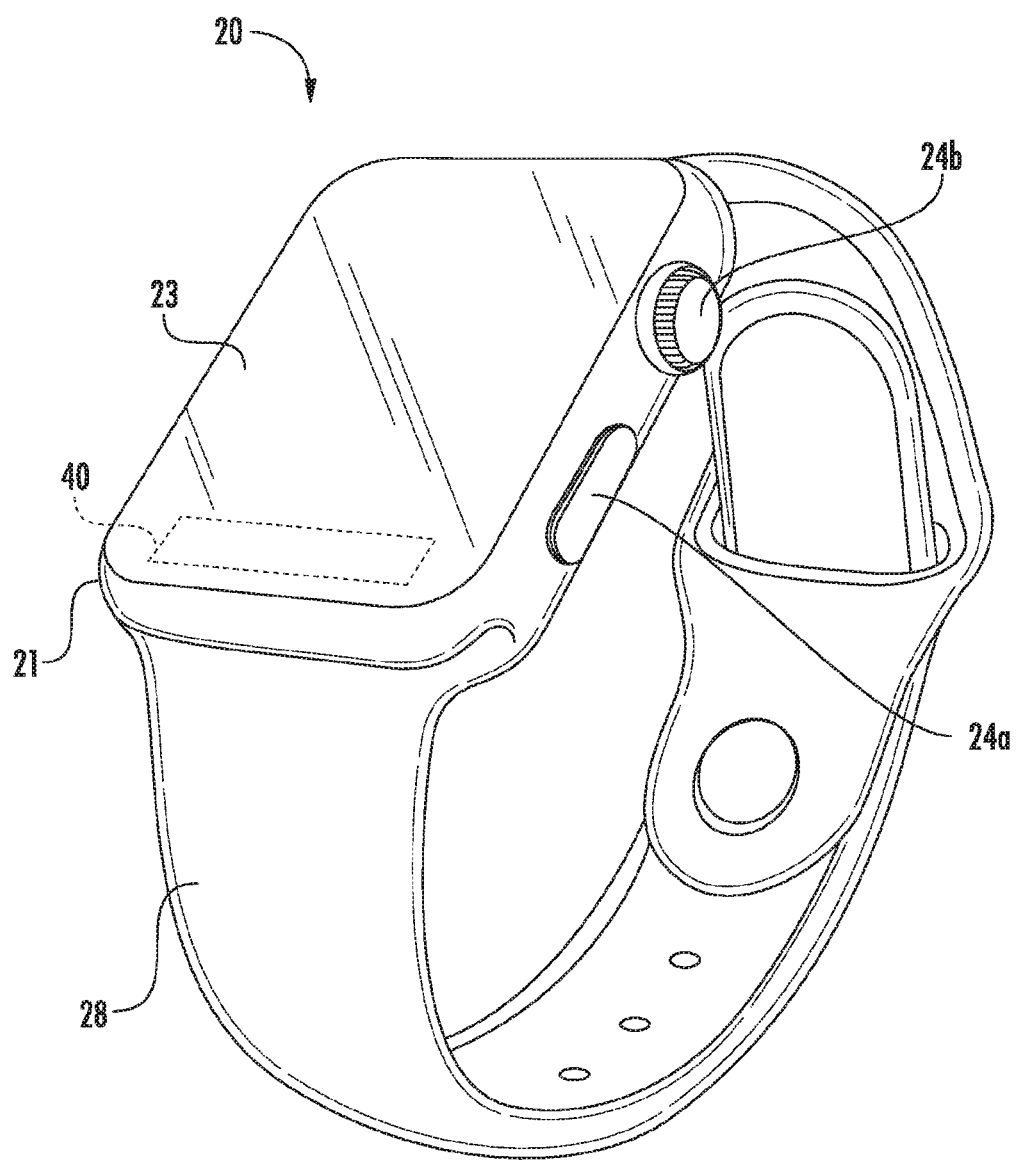
FIG. 1 is a perspective view of an electronic device including a haptic actuator according to an embodiment of the present invention.
Figure 2:
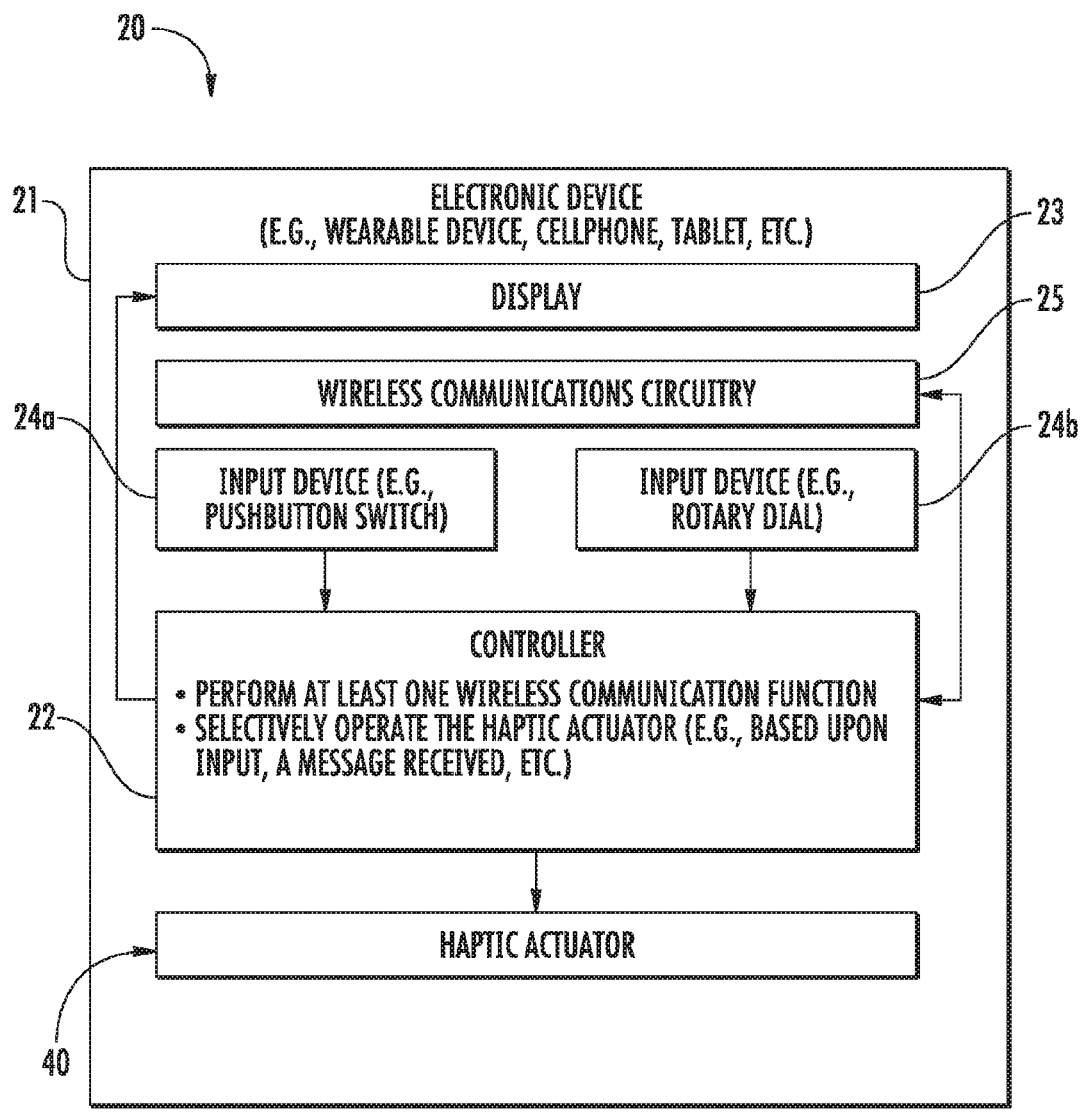
FIG. 2 is a schematic block diagram of the electronic device of FIG. 1.

Referring initially to FIGS. 1 and 2, an electronic device 20 illustratively includes a device housing 21 and a device controller 22 carried by the device housing. The electronic device 20 is illustratively a mobile wireless communications device, for example, a wearable wireless communications device, and includes a band 28 or strap for securing it to a user. The electronic device 20 may be another type of electronic device, for example, a cellular telephone, a tablet computer, a laptop computer, etc.

Wireless communications circuitry 25 (e.g. cellular, WLAN Bluetooth, etc.) is also carried within the device housing 21 and coupled to the device controller 22. The wireless communications circuitry 25 cooperates with the device controller 22 to perform at least one wireless communications function, for example, for voice and/or data. In some embodiments, the electronic device 20 may not include wireless communications circuitry 25.

A display 23 is also carried by the device housing 21 and is coupled to the device controller 22. The display 23 may be a liquid crystal display (LCD), for example, or may be another type of display, as will be appreciated by those skilled in the art.

Finger-operated user input devices 24a, 24b, illustratively in the form of a pushbutton switch and a rotary dial are also carried by the device housing 21 and is coupled to the device controller 22. The pushbutton switch 24a and the rotary dial 24b cooperate with the device controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the device controller 22 and provides haptic feedback to the user in the form of relatively long and short vibrations or "taps", particularly when the user is wearing the electronic device 20. The vibrations may be indicative of a message received, and the duration of the vibration may be indicative of the type of message received. Of course, the vibrations may be indicative of or convey other types of information. More particularly, the device controller 22 applies a voltage to move a moveable body or a mass 51 between first and second positions.

While a device controller 22 is described, it should be understood that the device controller 22 may include one or more of a processor and other circuitry to perform the functions described herein. The controller 22 may also be embodied as one or more of a field programmable gate array (FPGA), microcontroller, digital signal processor (DSP), central processing unit (CPU), or application specific integrated circuit.

Figure 3:
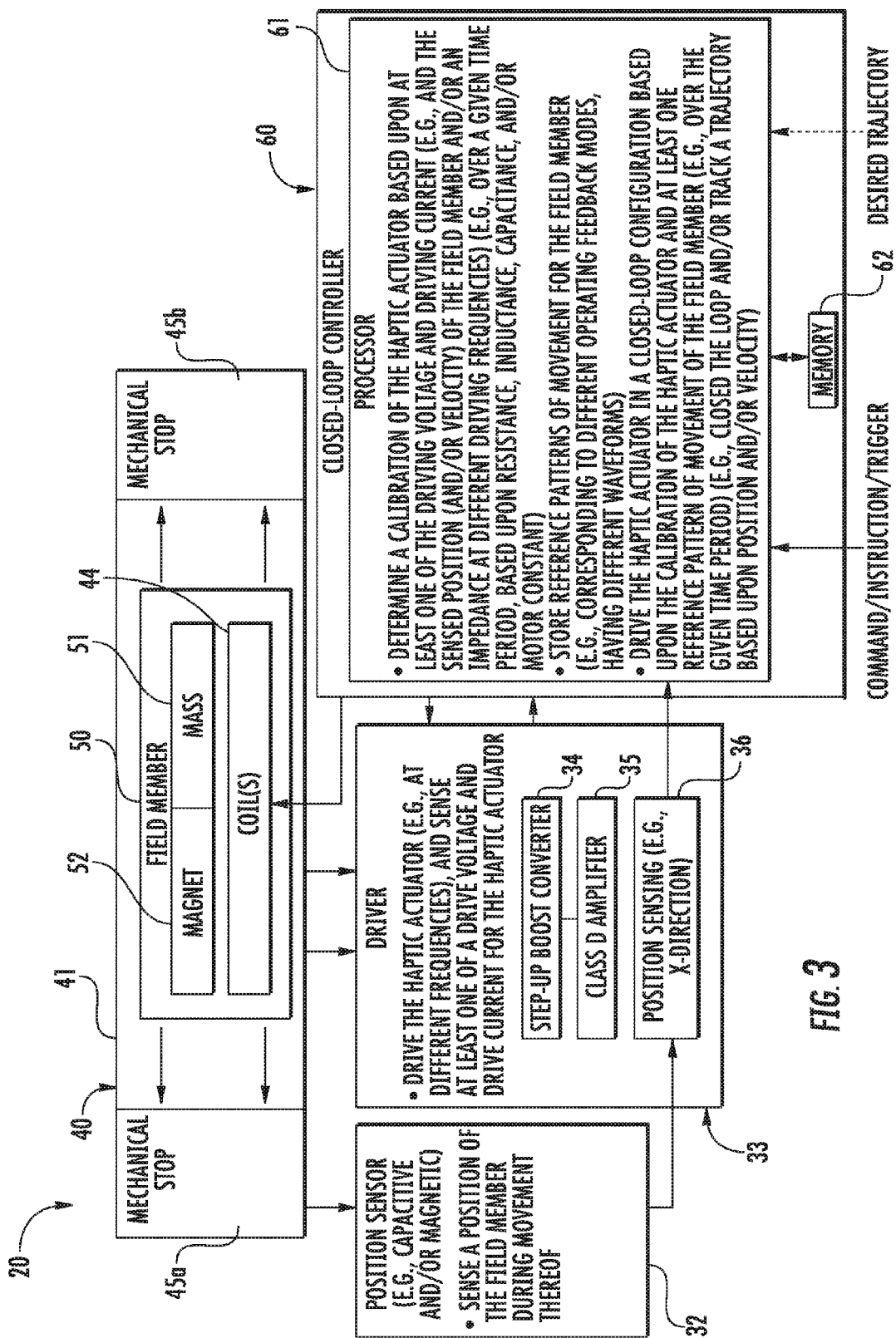
FIG. 3 is a more detailed schematic diagram of the haptic actuator of FIG. 1.
Figure 5A:
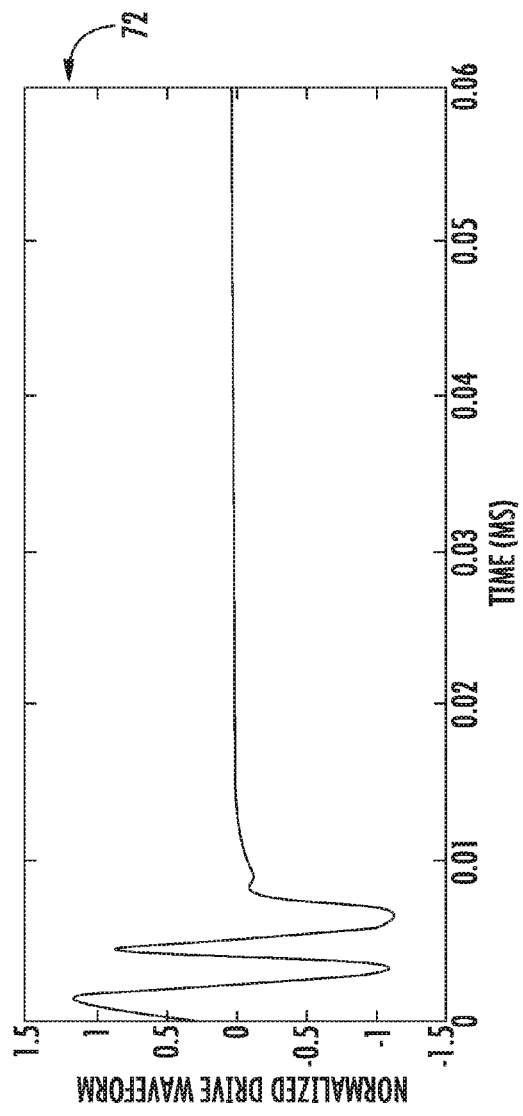
FIG. 5a is a graph of an exemplary 250 Hz mini-tap drive waveform generated for the haptic actuator of FIG. 3 in accordance with an embodiment.
Figure 5B:
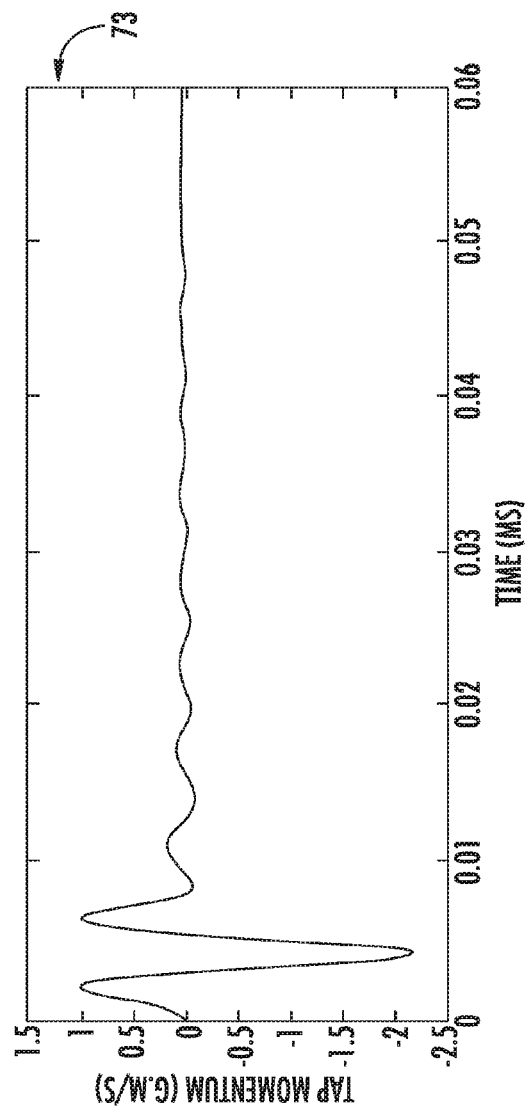

Referring now additionally to FIG. 3, the haptic actuator 40 includes an actuator housing 41 and a coil 44 carried by the housing. Of course, there may be more than one coil carried by the housing 41.

A field member 50 is movable within the housing 41 responsive the coil 44. The movement of the field member 50 creates the haptic feedback, or tapping, as will be appreciated by those skilled in the art. While the movement of the field member 50 may be described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 may include one or more masses 51 and may be shaped for a particular application or operation. The field member 50 may also include one or more permanent magnets 52 cooperating with the coil 44 to provide movement of the field member. The field member 50 may also include a suspension system that may include one or more springs for maintaining the field member suspended in the housing 41. The springs may include mechanical springs, such as, for example, coil springs, leaf springs, and flexures. The springs may also or additionally include magnetic springs that, through interaction with the permanent magnets and/or ferritic parts of the actuator housing 41, if any, store and amplify the energy in the form of elastic/magnetic energy. In addition, the suspension system, for example, through shafts, linear/angular bearings, sliding bearings, flexures, multi-bar linkage mechanisms, and springs, may enable motion of the field member 50 in the desired direction (e.g. X axis in a linear actuator or around a certain axis in an angular actuator) while constraining motion in other degrees of freedom. The suspension system may include other and/or additional components for maintaining the suspension of the field member 50 as well as constrain movement of the field member.

The haptic actuator 40 also includes mechanical limit stops 45*a*, 45*b* between the housing 41 and the field member 50. The mechanical limit stops 45*a*, 45*b* limit the movement of the field member to a desired range and/or stop the field member from crashing or banging into the housing 41. While mechanical stops 45*a*, 45*b* are described, it will be appreciated that the mechanical stops may be part of or a portion of the housing 41.

Typically, circuitry generates a sinusoidal drive waveform that drives the field member to move from an initial at-rest position. However, as will be appreciated by those skilled in the art, in a stationary or at-rest position, the field member 50 has a static friction associated with it which may cause the field member to "get stuck" despite the application of a drive voltage. A certain amount of force or voltage is thus needed to overcome this static friction force to cause the field member 50 to move. One approach to drive the field member 50 from the at-rest position is to increase the drive voltage or amplitude of the sinusoidal drive waveform. However, once the static friction force is overcome, the field member 50 typically rapidly accelerates and crashes or bangs into the mechanical limit stops 45*a*, 45*b*.

In some applications it may be particularly desirable to not have the field member 50 hit or bang into the mechanical limit stops 45*a*, 45*b* as this may generate a corresponding "banging" noise. To reduce the amount of noise, for example, caused by the increased amplitude, the electronic device 20 may include circuitry for driving the field member 50 without contacting the mechanical limit stops 45*a*, 45*b*, as will be described in further detail below.

To drive the field member 50 without contacting the mechanical limit stops 45*a*, 45*b*, the electronic device 20 illustratively may also include a position sensor 32 that senses a position of the field member during movement thereof. The position sensor 32 may be a capacitive sensor, an optical sensor, a magnetic sensor, capacitive sensor, back EMF sensor, piezoresistive sensor, or piezoelectric sensor, for example. Of course, there may be more than one position sensor 32 and each position sensor may be a different type of sensor. The position sensor 32 may sense or output a pulse density modulated signal of the x-position of the haptic actuator 30 and may be used to close the closed loop and/or track a desired trajectory of the field member 50, as will be appreciated by those skilled in the art.

A driver 33 drives the haptic actuator 30, and senses a drive voltage and drive current for the haptic actuator. The driver 33 may sense one or both of the drive voltage and drive current for the haptic actuator 30. In some embodiments, the driver 33 may drive the haptic actuator 30 at different frequencies, which, as will be described in further detail below, may be used to estimate the system or haptic actuator parameters. The driver 33 may be include a class D amplifier 35 and a step-up converter 36 coupled thereto for signal processing between the haptic actuator 30 and a closed-loop controller 60. Additionally, position data, for example, X-axis position data, from the position sensor 32 may be processed by a position sensing component 36 of the driver 33.

The closed-loop controller 60 cooperates with the position sensor 32 and the driver 33 to determine a calibration of the haptic actuator 30 based upon the sensed position of the field member 50 and one of more of the driving voltage and driving current. The closed-loop controller 60 includes a processor 61 and a memory 62 coupled thereto. While a processor 61 and a memory 62 coupled thereto are described, it will be appreciated by those skilled in the art that there may be more than one processor and/or memory, and which may be shared. Also functions described as being performed by the closed-loop controller 60 should be understood as being performed by the processor 61. The memory 62 stores the calibration of the haptic actuator 30 and the reference pattern. The calibration may be determined based upon one or more of a resistance, inductance, capacitance, and a motor constant, for example. Of course, the calibration may be determined based upon other and/or additional factors.

The closed-loop controller 60, particularly, the processor 61, stores reference patterns of movement for the field member 50 in the memory 62. The reference patterns of movement are different, with each reference pattern of movement corresponding to a desired one of different operating modes of haptic feedback. More particularly, it may be desirable to operate the haptic actuator 30 in any of a vibe (longer duration feedback) mode, a tap (short duration) mode, a mini-tap mode, and a braking mode, for example, with each of the reference patterns having a different drive waveform associated therewith. The haptic actuator 30 may be operated in any number of modes based upon a desired type of haptic feedback.

The closed-loop controller processor 61 also drives the haptic actuator in a closed-loop configuration based upon the calibration of the haptic actuator and at least one reference pattern of movement of the field member. Where the driver 33 drives the haptic actuator at different frequencies, the closed-loop controller 60 determines the calibration based upon a sensed impedance of the haptic actuator at the plurality of different frequencies.

In some embodiments, the closed-loop controller processor 61 may determine the calibration of the haptic actuator over a given time period and stored in the memory 62. The closed-loop controller 60 may drive the haptic actuator 30 in the closed-loop configuration based upon the calibration of the haptic actuator over the given time period. In other words, the calibration of the haptic actuator 30 may be learned over the given time period.

The closed loop controller 60 may receive as an input, a command, instruction, and/or trigger, which would trigger the closed loop controller to generate the desired waveforms, or in other words, to drive the haptic actuator 30, based upon the calibration and in one of the modes described above (e.g., mini-tap or a desired arbitrary waveform that may be synthesized by an upstream system processor or controller 22). The closed loop controller 60 may also optionally receive as an input, a desired trajectory input to "push" the closed loop controller to follow the arbitrary synthesized waveform, for example.

Further details of the closed-loop controller 60 will now be described. The processor 61 of the closed-loop controller 60 may operate as a state observer, which can generate a state space model based upon the dynamic model of the haptic actuator 30 or system, for example, the motor constant and/or the motor capacitance, and using a system identification protocol or an adaptive observer as will be appreciated by those skilled in the art. The state observer may include or operate based upon a linear quadratic estimation, for example, a Kalman filter. In other words, the calibration may be determined based upon a linear quadratic estimation.

Since it may be particularly desirable to obtain the velocity of the mass 51, the closed-loop controller 60, may estimate the velocity based upon the measured voltage and current, and may ignore the mechanical model of the haptic actuator 30 or system. The velocity may be used by the closed-loop controller 60 to close the closed loop and/or track a desired trajectory, as will be appreciated by those skilled in the art.

The actuator may be defined by:

$$\begin{cases} m\ddot{x} + c_M \dot{x} + k_M x = k_{motor} I \\ V = RI + L\dot{I} + k_{motor}\dot{x} \end{cases}$$

The state space model may be defined as:

$$\begin{cases} \frac{d}{dt}\begin{bmatrix} x \\ \dot{x} \\ I \end{bmatrix} = \begin{bmatrix} 0 & 1 & 0 \\ \frac{-k_M}{m} & \frac{-c_M}{m} & \frac{k_{motor}}{m} \\ 0 & \frac{-k_{motor}}{L} & \frac{-R}{L} \end{bmatrix} \begin{bmatrix} x \\ \dot{x} \\ I \end{bmatrix} + \begin{bmatrix} 0 \\ 0 \\ \frac{1}{L} \end{bmatrix} V \\ \begin{bmatrix} I \\ V \end{bmatrix} = \begin{bmatrix} 0 & 0 & 1 \\ 0 & 0 & 0 \end{bmatrix} \begin{bmatrix} x \\ \dot{x} \\ I \end{bmatrix} + \begin{bmatrix} 0 \\ 1 \end{bmatrix} V \end{cases}$$

$$\begin{cases} \dot{X} = A_c X + B_c u \\ Y = C_c X + D_c u \end{cases}$$

The state space in the discrete domain may be defined as:

$$\begin{cases} x[n+1] = A_d x[n] + B_d u[n] \\ y[n] = C_d x[n] + D_d u[n] \end{cases}$$

Taking the above continuous to the discrete transformation:

$$A_d = e^{A_c T_s}, B_d = A_c^{-1}(A_d - I)B_c, C_d = C_c, D_d = D_c$$

State Observer:

$$\begin{cases} \tilde{x}[n+1] = A_d \tilde{x}[n] + B_d u[n] + L_d(y[n] - \tilde{y}[n]) \\ \tilde{y}[n] = C_d \tilde{x}[n] + D_d u[n] \end{cases}$$

The state observer gain, $L_c$, is set by placing the poles of the observed system $(A_c - L_c C_c)$ at $\lambda_1, \lambda_2, \lambda_3$. Discrete domain observer gains may be estimated as: $L_d = (A_c^{-1}(A_d - I)L_c$.

The system identification of the haptic actuator 30 with respect to electrical impedance analysis will now be described. The dynamics of the haptic actuator 30 in the Laplace domain may be defined as:

$$\begin{cases} [ms^2 + c_M s + k_M]X(s) = k_{motor}I(s) \\ V(s) = [R + Ls]I(s) + k_{motor}sX(s) \end{cases}$$

The electrical impedance of the haptic actuator 40 may be described as:

$$Z(s) = \frac{V(s)}{I(s)} = \underbrace{R + Ls}_{Z_E} + \underbrace{\frac{k_{motor}^2 s}{ms^2 + c_M s + k_M}}_{Z_{EM}}$$

As described above, the parameters of the system can be estimated by the exiting or driving the haptic actuator 40 at different frequencies and measuring the complex electrical impedance. This may be accomplished by using an I/Q mode or a fast Fourier transform (FFT), for example. For a relatively simple velocity based closed-loop controller 60, only resistance R may be estimated on DC current such that:

$$2/R = I(+V) - I(-V).$$

The graphs 70, 71 in FIGS. 4a and 4b are bode diagrams of frequency versus magnitude and frequency versus phase, respectively, of an electrical impedance analysis of the haptic actuator 40.

Further details of the different reference patterns of movement, specifically each corresponding different operating modes of haptic feedback will now be described. In particular, one mode of haptic feedback referred to as "mini-tap drive control" may be described as:

$$\begin{cases} u[n] = V_{max} & 0 < n < \frac{f_0}{T_s(1.4 f_{Tap}^2 + 0.6 f_{Tap} f_0)} \\ u[n] = -V_{max} & \frac{0.5}{f_{Tap} T_s} < n < \frac{1}{f_{Tap} T_s} \end{cases}$$

Another mode referred to as "sinusoidal tap" (e.g. low frequency tap mini-tap) may be described as:

$$u[n] = V_{max} u[n] = V_{max} \sin(2\pi f_{Tap} T_s n) \quad 0 < n < \frac{0.75}{f_{Tap} T_s}$$

Other modes include:
"Resonance Vibe Drive":

$$\begin{cases} u[n] = V_{max} \text{sgn}(\dot{\tilde{x}}[n]) & \dot{\tilde{x}}[n]^2 + \omega_0^2 \tilde{x}[n]^2 < \dot{x}_{set\_vibe}^2 \\ u[n] = 0 & \dot{\tilde{x}}[n]^2 + \omega_0^2 \tilde{x}[n]^2 > \dot{x}_{set\_vibe}^2 \end{cases}$$

"Specific Frequency Vibe Drive":

$$\begin{cases} u[n] = V_{max} \text{sgn}(\sin(2\pi f_{vibe} T_s n)) & \dot{\tilde{x}}[n]^2 + \omega_{vibe}^2 \tilde{x}[n]^2 < \dot{x}_{set\_vibe}^2 \\ u[n] = 0 & \dot{\tilde{x}}[n]^2 + \omega_{vibe}^2 \tilde{x}[n]^2 > \dot{x}_{set\_vibe}^2 \end{cases}$$

"Tap Vibe Brake Control":

$$u_{PD}[n] = -a\tilde{x}[n] + b\tilde{x}[n-1]$$
$$\begin{cases} u[n] = u_{PD}[n] & |u_{PD}[n]| < V_{max} \\ u[n] = V_{max}\text{sgn}(u_{PD}[n]) & |u_{PD}[n]| > V_{max} \end{cases}$$

"Tap Drive Bang-Bang Control":

$$\begin{cases} u[n] = V_{max} & 0 < n < \dfrac{0.5}{f_{Tap}T_s} \\ u[n] = -V_{max} & \dfrac{0.5}{f_{Tap}T_s} < n < \dfrac{1}{f_{Tap}T_s} \end{cases}$$

"Vibe Drive Bang-Bang Control":

$$\begin{cases} u[n] = V_{max}\text{sgn}(\tilde{\dot{x}}[n]) & |\tilde{\dot{x}}[n]| < \dot{x}_{set\_vibe} \\ u[n] = 0 & |\tilde{\dot{x}}[n]| > \dot{x}_{set\_vibe} \end{cases}$$

Of course, there may be other and/or additional modes as will be appreciated by those skilled in the art.

A smoothing drive signal, for example, a first order low pass filter, may be applied as follows:

$$u_F[n] = au[n] + (1-\alpha)u[n-1]$$

Referring now to FIGS. 5-8, exemplary graphs illustrate simulations of the different drive waveforms, momentum, voltage, and/or displacement for several modes. Referring particularly to the graph 72 in FIG. 5a, a normalized drive waveform for a "mini-tap" at 250 Hz is illustrated for the haptic actuator 40. The graph 73 in FIG. 5b illustrates the tap momentum for the "mini-tap" at 250 Hz.

Figure 6A:
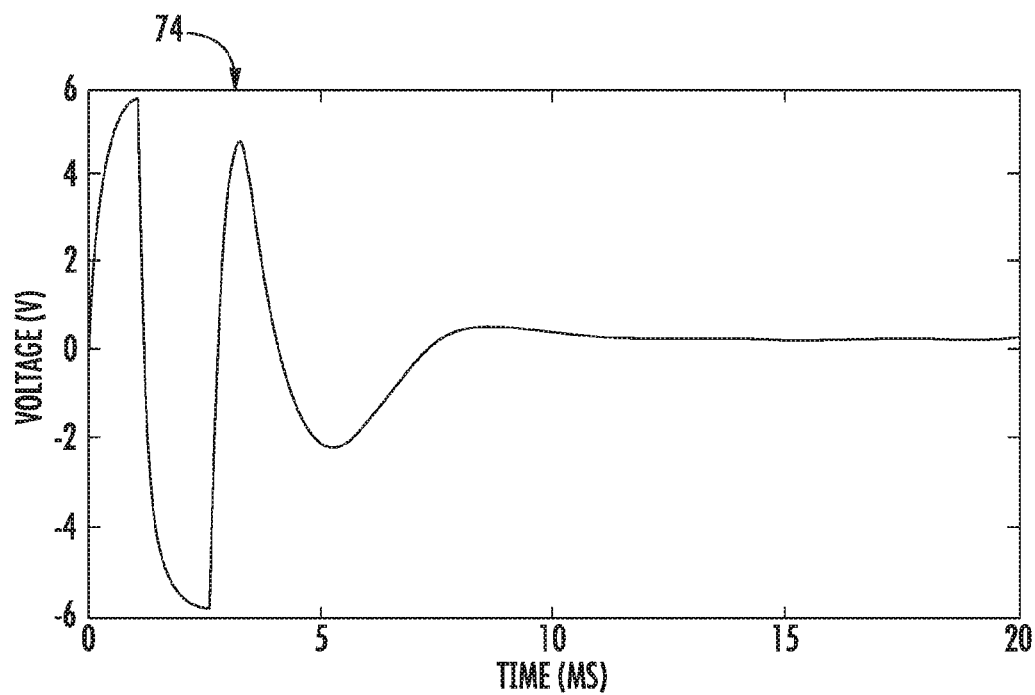
FIG. 6a is a graph of an exemplary square mini-tap drive waveform generated for the haptic actuator of FIG. 3 in accordance with an embodiment.
Figure 6B:
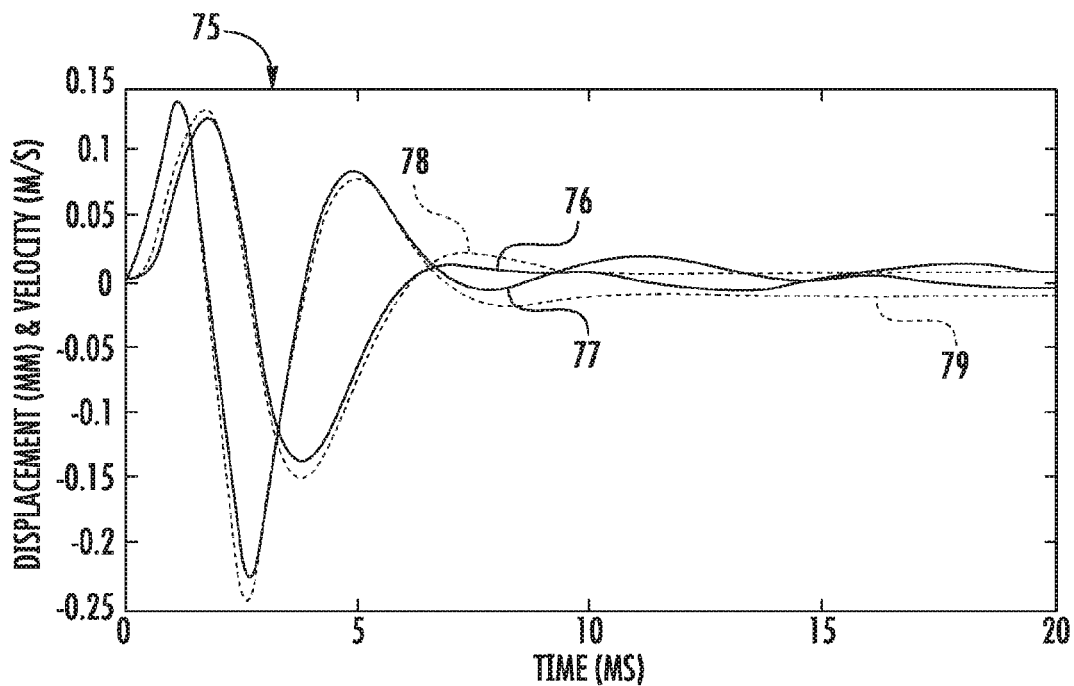

The graph 74 in FIG. 6a illustrates the drive waveform of a "square mini-tap" (at a frequency greater than 130 Hz) and the graph 75 in FIG. 6b illustrates the "square mini-tap" response, with the line 76 indicating expected displacement (in mm), the line 77 indicating expected velocity (in m/s), the line 78 indicating observed displacement (in mm), and the line 79 indicating observed velocity (in m/s).

Figure 7A:
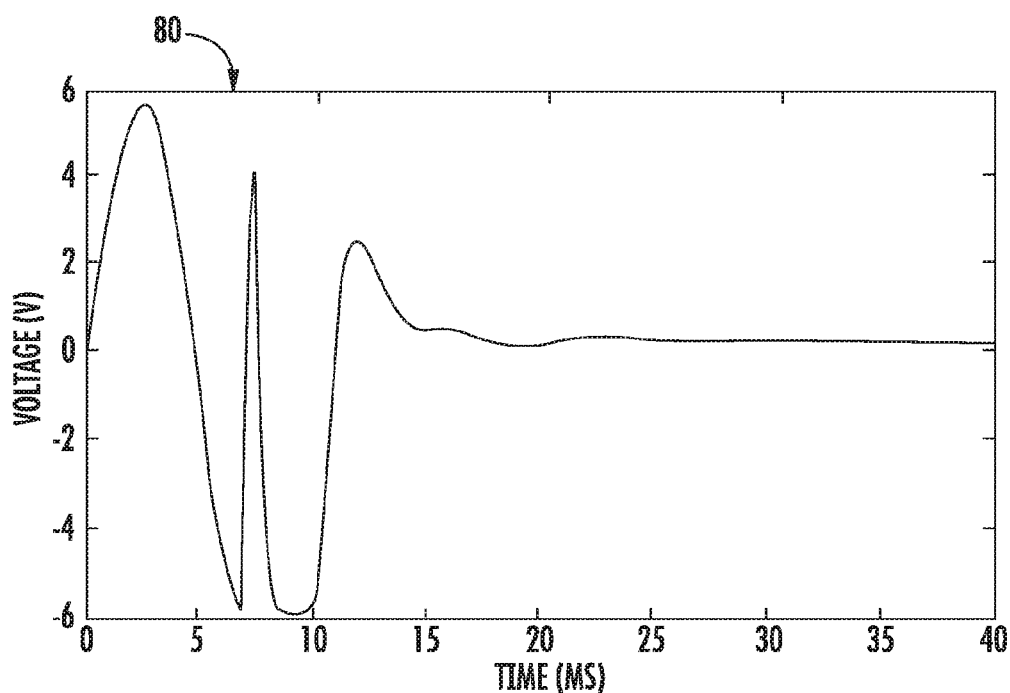
FIG. 7a is a graph of an exemplary sinusoidal mini-tap drive waveform generated for the haptic actuator of FIG. 3 in accordance with an embodiment.
Figure 7B:
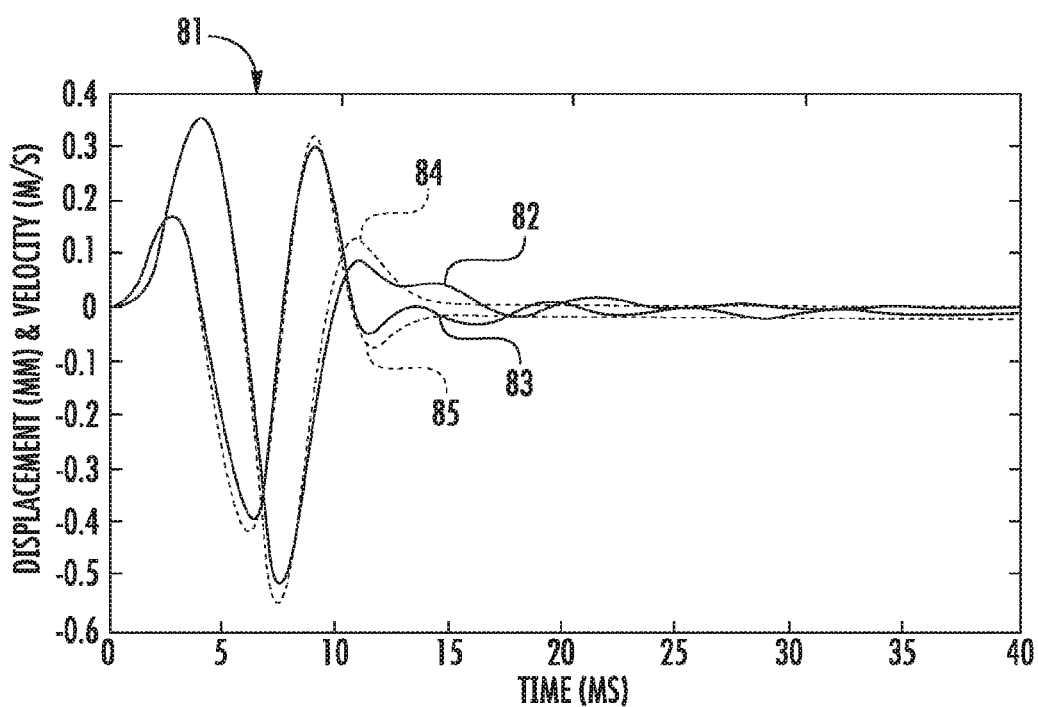

The graph 80 in FIG. 7a illustrates the drive waveform of a "sine mini-tap" (at a frequency less than 130 Hz) and the graph 81 in FIG. 7b illustrates the "sine mini-tap" response, with the line 82 indicating expected displacement (in mm), the line 83 indicating expected velocity (in m/s), the line 84 indicating observed displacement (in mm), and the line 85 indicating observed velocity (in m/s).

Figure 8A:
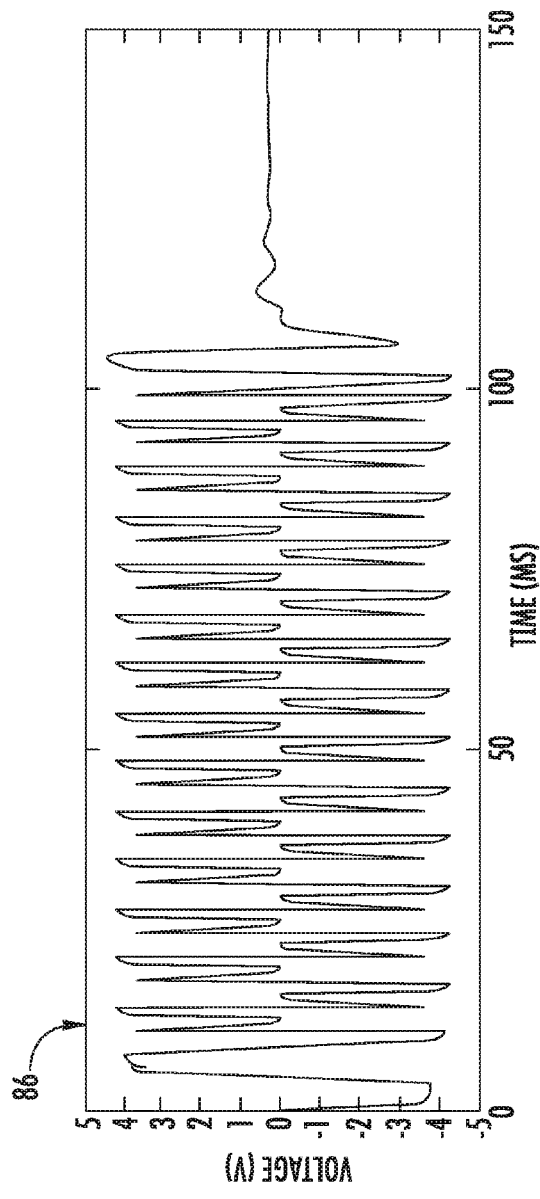
FIG. 8a is a graph of an exemplary resonance vibe drive waveform generated for the haptic actuator of FIG. 3 in accordance with an embodiment.
Figure 8B:
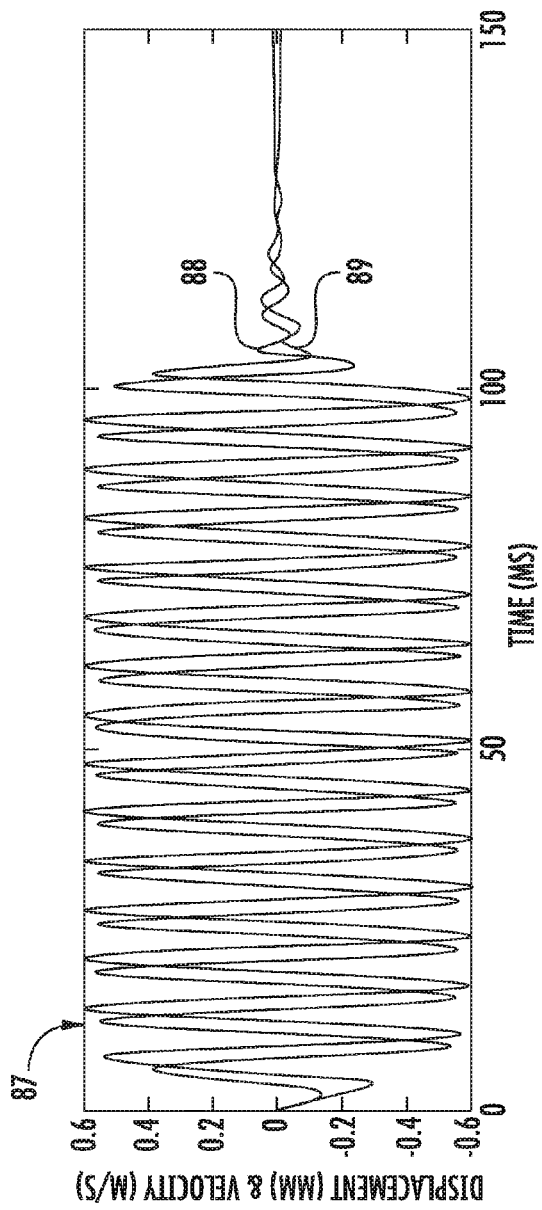

The graph 86 in FIG. 8a illustrates a "resonance vibe" drive waveform. The graph 87 in FIG. 8b illustrates the displacement 88 (in mm) and velocity 89 (in m/s) for the "resonance vibe" mode.

Figure 9:
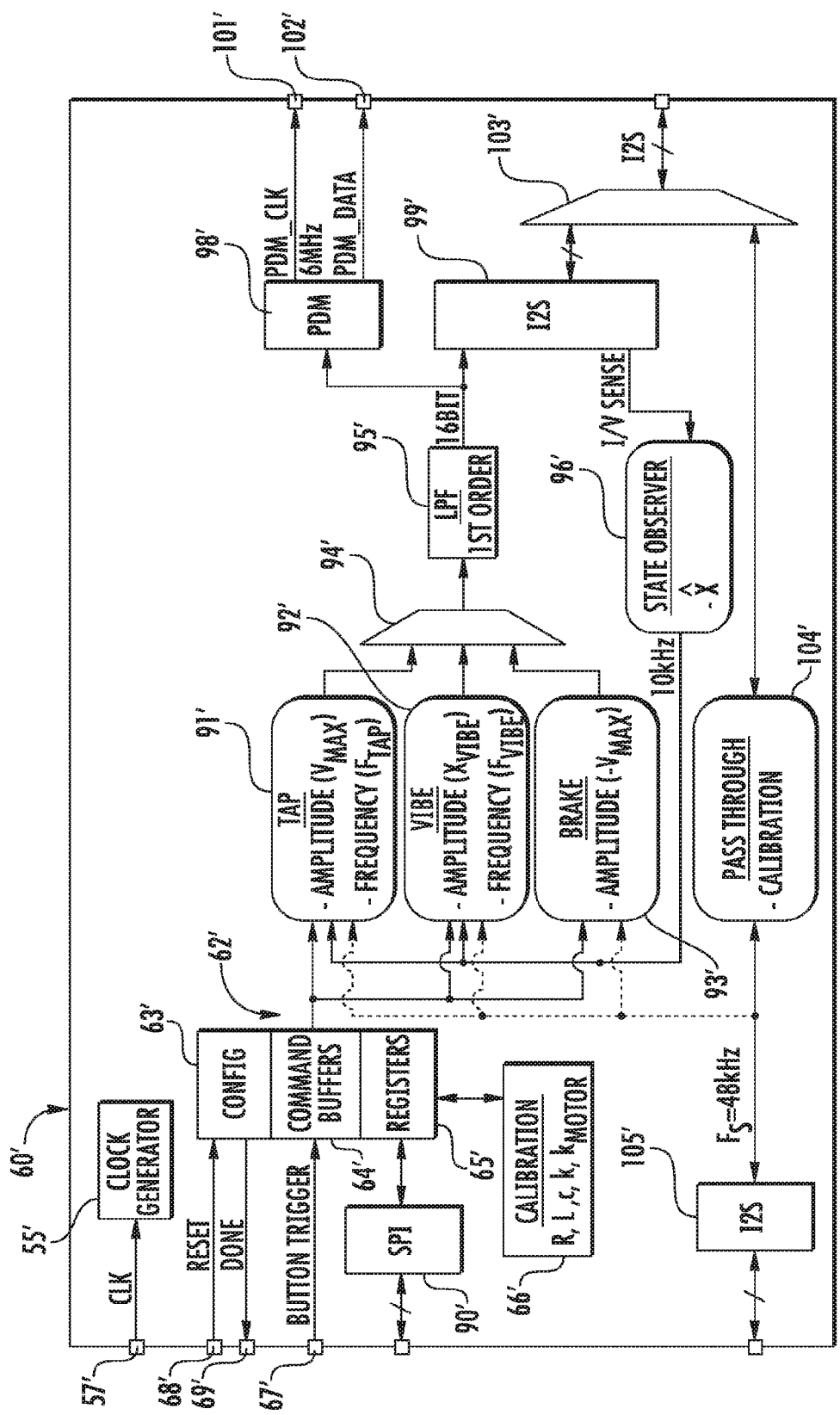
FIG. 9 is a schematic diagram of a closed-loop controller in accordance with another embodiment.

Referring now to the schematic diagram in FIG. 9, a more detailed schematic diagram of an exemplary embodiment of a closed-loop controller 60' implemented as a field programmable gate array (FPGA) is illustrated. A clock generator 55' having an input 57' is illustratively carried by a substrate 56'. The memory 62' is illustratively divided and includes configuration memory 63' for storing configuration parameters, command buffers 64' for storing commands, and registers 65' for storing sensed data and/or other data. The memory 62' also includes a calibration memory 66' for storing data related to the calibration, for example, resistance, inductance, capacitance, and a motor constant. A button trigger input 67' is coupled to the command buffers 64', and a reset input 68' and a status output 69', i.e., command done, are coupled to the configuration memory 63'. A serial peripheral interface (SPI) interface 90' is coupled to the registers 65'.

The command buffers 64' may output the different reference patterns of movement each corresponding to a desired one of a plurality of different operating modes of haptic feedback, e.g., tap 91', vibe 92', and brake 93'. The output of each of the tap 91', vibe 92', and brake 93' operating modes is coupled to a multiplexer 94', an output of which is coupled to a filter 95', for example, a first order low pass filter. Each of the tap 91', vibe 92', and brake 93' modes has an input which may receive a 10 kHz signal and is coupled to the state observer 96', which has been described above. As described above, the state observer 96' receives or cooperates to receive or sense the drive current and the drive voltage. In the present embodiment, the state observer receives the sensed drive current and drive voltage from an inter-IC Sound (I²S) interface 97'.

The output of the filter 95' is also coupled to the I²S interface 99' (e.g. a 16-bit output), and also coupled to a pulse density modulator (PDM) 99'. The PDM outputs a clock signal 101' at, for example, 6 MHz, and a data signal 102'. The I²S interface 99' is coupled to an input of a multiplexer 103'. Another input of the multiplexer 103' is coupled to a pass through 104' which includes the calibration. The pass through 104' is coupled to another I²S interface 105' and communicates therewith at 48 kHz, for example. The pass through 104' may optionally be coupled to each of the tap 91', vibe 92', and brake 93' modes.

A method aspect is directed to a method of operating a haptic actuator 40 that includes an actuator housing 41 and a field member movable 50 within the housing. The method includes sensing, using a position sensor 32, a position of the field member during movement thereof, driving, using a driver 33, the haptic actuator 40, and sensing, using the driver, at least one of a drive voltage and drive current for the haptic actuator. The method also includes using a closed-loop controller 60 cooperating with the position sensor 32 and driver 33 to determine a calibration of the haptic actuator based upon the sensed position of the field member and at least one of the driving voltage and driving current, store at least one reference pattern of movement for the field member, and drive the haptic actuator in a closed-loop configuration based upon the calibration of the haptic actuator and at least one reference pattern of movement of the field member.

Figure 10:
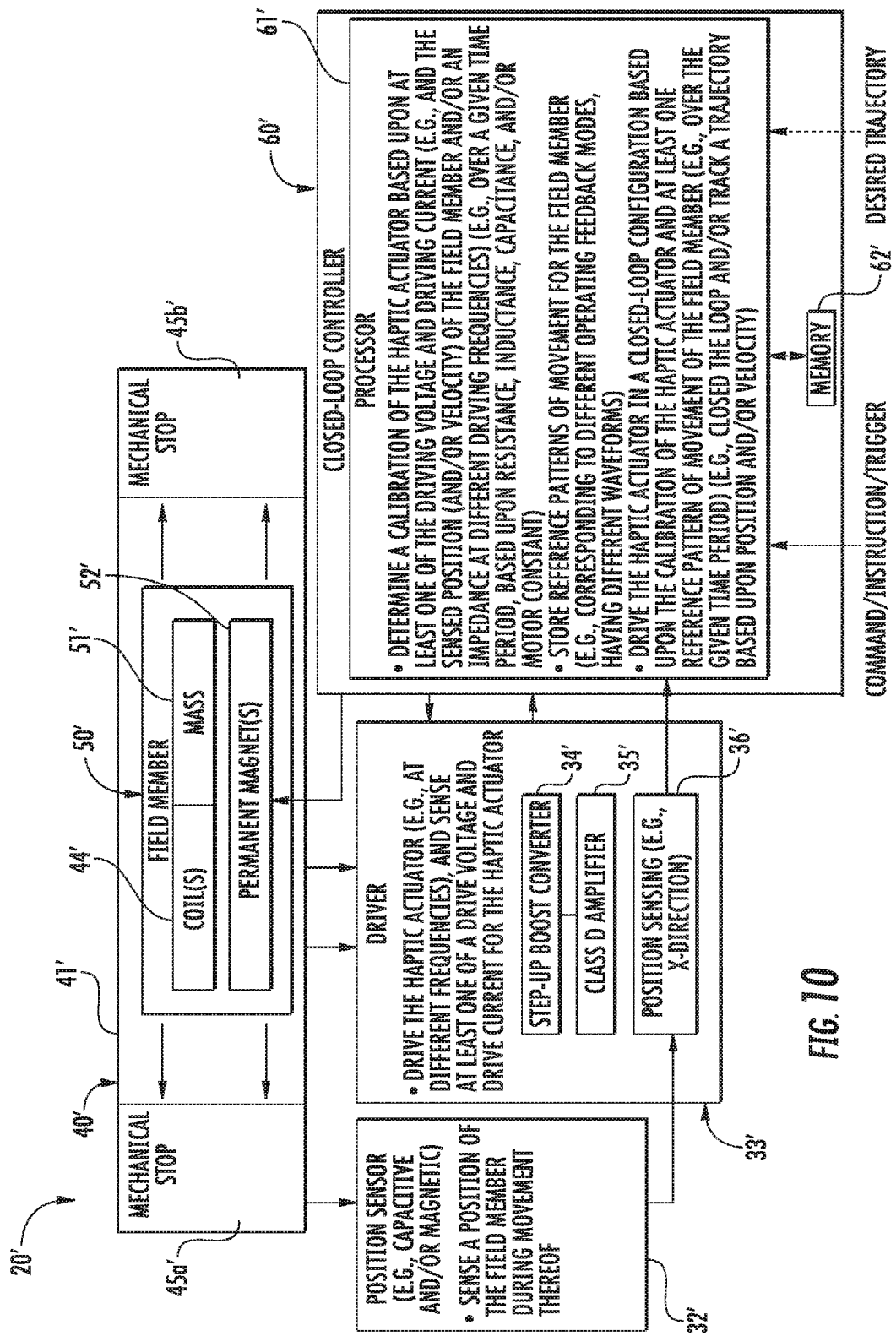
FIG. 10 is a schematic diagram of a haptic actuator according to another embodiment.

Referring now to FIG. 10, in another embodiment, the haptic actuator 40" may include a permanent magnet 52" carried by the actuator housing 41", and the field member 50" may include one or more coils 44" that cooperate with the permanent magnet. In other words, in contrast to the embodiment described above, the permanent magnet is stationary (i.e., carried by the actuator housing 41") and the coils 44", as part of the field member 50" are moving (i.e., connected to the mass). Of course, there may be any number of coils and/or permanent magnets.

Figure 11:
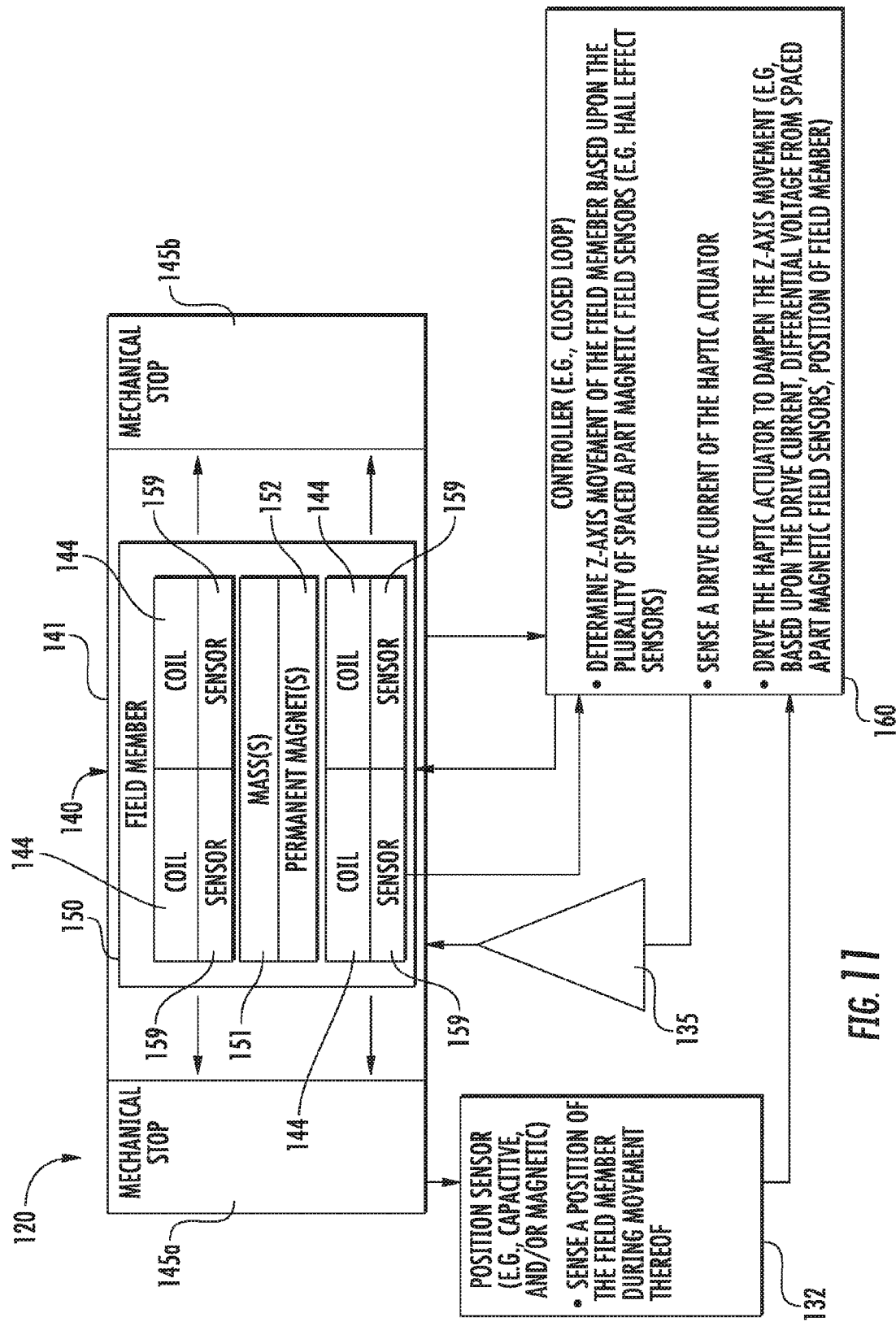
FIG. 11 is a schematic diagram of an electronic device according to another embodiment.
Figure 12:
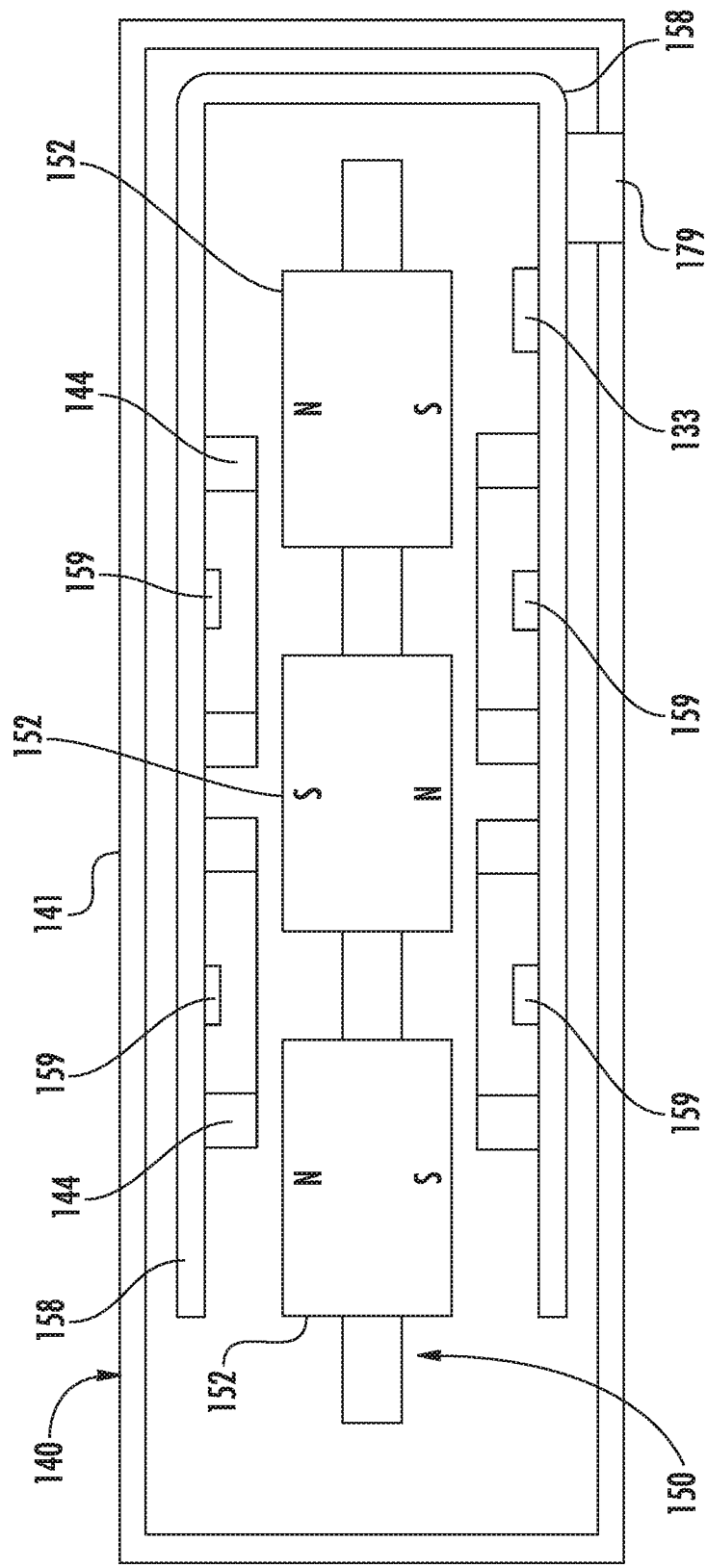
FIG. 12 is a more detailed schematic diagram of a haptic actuator according to an embodiment.

Referring now to FIGS. 11 and 12 in another embodiment, an electronic device 120 illustratively includes a haptic actuator 140 that includes an actuator housing 141 and coils 144 (e.g., drive coils) carried within the actuator housing. The haptic actuator 140 also includes a field member 150 that is movable along an x-axis within the actuator housing 141 responsive to the coils 144. The field member 150 may include one or more masses 151 and may be shaped for a particular application or operation. The field member 150 may also include one or more permanent magnets 152 cooperating with the coils 144 to provide movement of the field member. A connector 179 is carried by the actuator housing 141.

The field member 150 is also susceptible to movement in y-axis and z-axis directions, for example, that may result from movement along the x-axis, as will be appreciated by those skilled in the art. The haptic actuator 140 also includes mechanical limit stops 145*a*, 145*b* between the housing 141 and the field member 150 as described above.

The haptic actuator 140 also includes spaced apart magnetic field sensors 159, for example, Hall Effect sensors, carried within the actuator housing 141 between the coils 144. More particularly, the spaced apart magnetic field sensors 159 (and the coils 144) may be carried by a flexible substrate 158 carried within the actuator housing 141. Of course, other components may be carried by the flexible substrate 158 or a flexible substrate may not be included (e.g., the spaced apart magnetic field sensors being carried by the actuator housing 141).

The spaced apart magnetic field sensors 159 sense a magnetic field based upon movement of the field member 150. The spaced apart magnetic field sensors 159 may sense the magnetic field based upon a differential output voltage from the magnetic field sensors, for example. Of course, other techniques may be used to sense the magnetic field from the spaced apart magnetic sensors 159.

The electronic device 120 also includes a controller 160 coupled to the haptic actuator via a power amplifier 135. The controller 160 may be a closed-loop controller, for example, as described in the above-embodiments and may include an actuator driver 133, for example, which may be in the form of an integrated circuit and carried within the actuator housing 141. The controller 160 determines z-axis movement of the field member based upon the spaced apart magnetic field sensors 159. The controller 160, and more particularly, the actuator driver 133, also drives the haptic actuator 140 to dampen the z-axis movement.

As will be appreciated by those skilled in the art, using a single magnetic field sensor may be particularly undesirable as it may not allow for determination of x-axis or z-axis motion. Using more than one magnetic field sensor 159 advantageously allows for determination of x-axis and z-axis movement. In other words, increased accuracy may be preserved as z-axis movement may alter or change the x-axis movement. Any number of spaced apart magnetic field sensors 159 may be used. For example, using two spaced apart magnetic field sensors 159 may permit determination of z-axis movement, but with little sensitivity to rotation. With three spaced apart magnetic field sensors 159, sensitivity to rotation may be increased.

In some embodiments, the controller 160 may also sense a drive current of the haptic actuator 140 and drive the haptic actuator based upon the drive current. The controller 160 drives the haptic actuator 140 to dampen the z-axis movement, as will be appreciated by those skilled in the art. It will be appreciated by those skilled in the art that portions of or all of the controller 160 may be carried within the actuator housing 141 or outside the actuator housing, for example, within a device housing.

Similar to the embodiments described above, the controller 160 may also determine a calibration of the haptic actuator based upon drive current and the sensed magnetic field from the spaced apart magnetic field sensors 159, store a reference pattern of movement for the field member 150, and drive the haptic actuator 140 in a closed-loop configuration based upon the calibration of the haptic actuator and a reference pattern of movement of the field member. For example, the controller 160 may, based upon the drive current, subtract the electromagnetic coupling (coil field) based upon the current.

The reference pattern of movement may include different reference patterns of movement, each corresponding to a desired one of different operating modes of haptic feedback, for example, tap, vibe, etc. Each of the reference patterns may have a different drive waveform associated therewith.

The controller 160, for example, may perform a position response scaling and linearization based upon calibration data, for example. This may be particularly advantageous because the outputs of the spaced apart magnetic field sensors 159 are slightly non-linear. Thus it may be desirable to measure the non-linear response and apply the inverse to linearize the output of the magnetic sensors. The non-linear response may be measured from the sinusoid, as will be appreciated by those skilled in the art, and typically performed just prior to gain calibration.

The haptic actuator 140 also includes a position sensor 132 (FIG. 11) for sensing a position of the field member 150 during movement thereof. The controller 160 also drives the haptic actuator 140 based upon the position of the field member 150, to further dampen the z-axis movement.

A test platform for calibrating the haptic actuator 140 is now described. Some testing operations of the haptic actuator 140 include using a laser, but when positioned in a system, this technique may be undesirable as it requires openings in the actuator housing 141. A Hall Effect sensor calibration using the spaced apart magnetic field sensors 159 may be used in addition to the laser technique. More particularly, back EMF is measured using the magnetic field sensors 159. It should be noted that going between back EMF and position may introduce errors, so this may be undesirable. Using the magnetic field sensors 159 for calibration and measurement, for example, may enable contact free travel measurement (versus back EMF), and generally not require an opening in the actuator housing 141 (versus laser). This magnetic field sensor technique also may provide the benefits of enabling system level characterization (versus laser), troubleshooting of magnetic field sensors 159, measuring magnetic leakage (module level and system level), and generally does not need calibration (fusion of data from the array).

In an exemplary test embodiment, an array of Hall Effect sensors, which may be in the form of an integrated circuit, may be used that is separate from the magnetic field sensors 159. The array of Hall Effect sensors may be positioned adjacent an exterior side of the actuator housing 141, for example, aligned along a length of the haptic actuator 140. Thus, calibration may be performed by making measurements from the array of Hall Effect sensors. An analog-to-digital converter (ADC) is used to measure the sensor, which will generate as an output, dX. From dX, a pass/fail determination can be made. The array of Hall Effect sensors may be particularly advantageous relative to other techniques, as it may be less sensitive, as will be appreciated by those skilled in the art. The array of Hall Effect sensors may be carried within the device housing as part of the overall device or system. Alternatively, the array of Hall Effect sensors may also be carried outside the electronic device housing (i.e., system housing)

Figure 13:
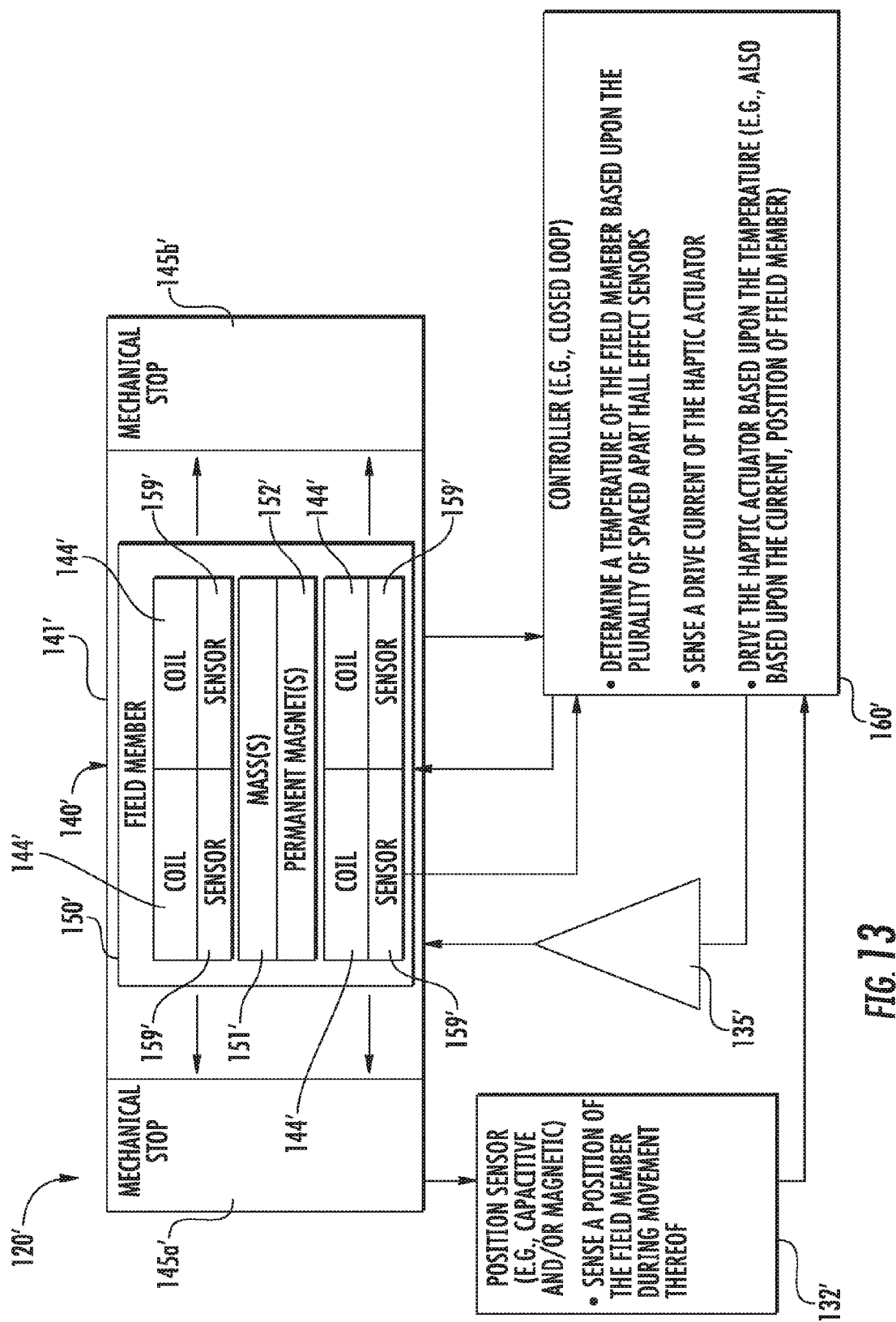
FIG. 13 is a schematic diagram of an electronic device according to another embodiment.

A method aspect is directed to a method of controlling a haptic actuator 140 that includes comprising an actuator housing 141, a plurality of coils 144 carried within the actuator housing, and a field member 150 capable of being movable along an x-axis within the actuator housing responsive to the at least one coil. The field member 150 is also susceptible to movement in a z-axis direction. The method may include using a controller 160 coupled to the haptic actuator for determining z-axis movement of the field member 150 based upon a plurality of spaced apart magnetic field sensors 159 carried within the actuator housing 141 between the plurality of coils 144 and capable of sensing a magnetic field based upon movement of the field member, and driving the haptic actuator 140 to dampen the z-axis movement Referring now to FIG. 13, in another embodiment, to dampen the z-axis movement, for example, spaced apart Hall Effect sensors 159' that are carried within the actuator housing between the coils 144' sense a temperature of the field member 150'. The controller 160' determines a temperature of the field member 150' based upon the Hall Effect sensors 159' and drives the haptic actuator 140' based upon the sensed temperature. The controller 160' may determine the temperature of the field member 150' based upon an output resistance of the Hall Effect sensors 159'.

Similar to the embodiment described above with respect to FIGS. 11 and 12, the controller 160' may be a closed loop controller and may sense a drive current of the haptic actuator 140' and drive the haptic actuator also based upon the sensed drive current. Removing the driving current may be a relatively straightforward operation, as that value is empirically determined through the calibration procedure. For temperature, for example, the Hall Effect sensors 159' are used to determine temperature by measuring an output resistance (e.g., instead of looking at differential output voltage) at each Hall Effect sensor location. Resistance of the coils 144' may also be measured. Accordingly, it may be desirable to know change of temperature of the field member 150' or more particularly, the permanent magnet 152'. The permanent magnet 152' may become increasingly hotter based upon use. Without temperature compensation, the error rate is above 15%, but with temperature compensation, this error rate can be brought down to about 5%, for example.

The controller 160' may also determine a calibration and drive the haptic actuator 140' based upon the calibration as described in detail above. Additional elements illustrated are similar to those described above with respect to the embodiment illustrated in FIGS. 11 and 12 and need no further discussion.

As will be appreciated by those skilled in the art, while the controller may determine both z-axis movement of the haptic actuator and the temperature of the field member, and drive the haptic actuator based upon both the temperature and the z-axis movement. Position of the field member and the drive current may also be used as a basis to drive the haptic actuator. In other words, z-axis movement and/or temperature, position, and/or drive current may be used to drive the haptic actuator.

A method aspect is directed to a method of controlling a haptic actuator 140' that includes an actuator housing 141', a plurality of coils 144' carried within the actuator housing, and a field member 150' movable within the actuator housing responsive to the at least one coil. The method includes using a controller 160' coupled to the haptic actuator for determining a temperature of the field member 150' based upon a plurality of spaced apart Hall Effect sensors 159' carried within the actuator housing 141' between the plurality of coils and capable of sensing a temperature of the field member, and driving the haptic actuator 140' based upon the temperature.

During operation, the magnetic fields from the spaced apart magnetic field sensors 159 are measured along with the fields generated by driving the haptic actuator 140. In particular, measurements based upon opposite coils 144 or magnetic field sensors 159 may be used to separate x-axis and z-axis translation. The current, for example, the driving current, is measured by the controller 160 and any influence from the driving the spaced apart magnetic field sensors 159 is subtracted out. Generally there is no physical shielding. However, in some embodiments, there may be physical shielding.

Z-axis movement of the haptic actuator 140 is generally undesirable as it may decrease efficiency of operation and/or increase noise levels during operation. For example, dropping of the electronic device, and more particularly the haptic actuator 140 may cause changes in how the haptic actuator operates that cause z-axis movement. The controller 160 cooperating with the spaced apart magnetic field sensors 159, (e.g., Hall Effect sensors), may advantageously dampen the z-axis movement.

While a haptic actuator 140 has been described herein, it should be understood that the haptic actuator may include other and/or additional components of the electronic device 120 much like the controller 160 may include other and/or additional circuitry carried within or outside the actuator housing 141, as described above. Moreover, any of the embodiments described herein may be used with any one or more other embodiments.

Figure 14:
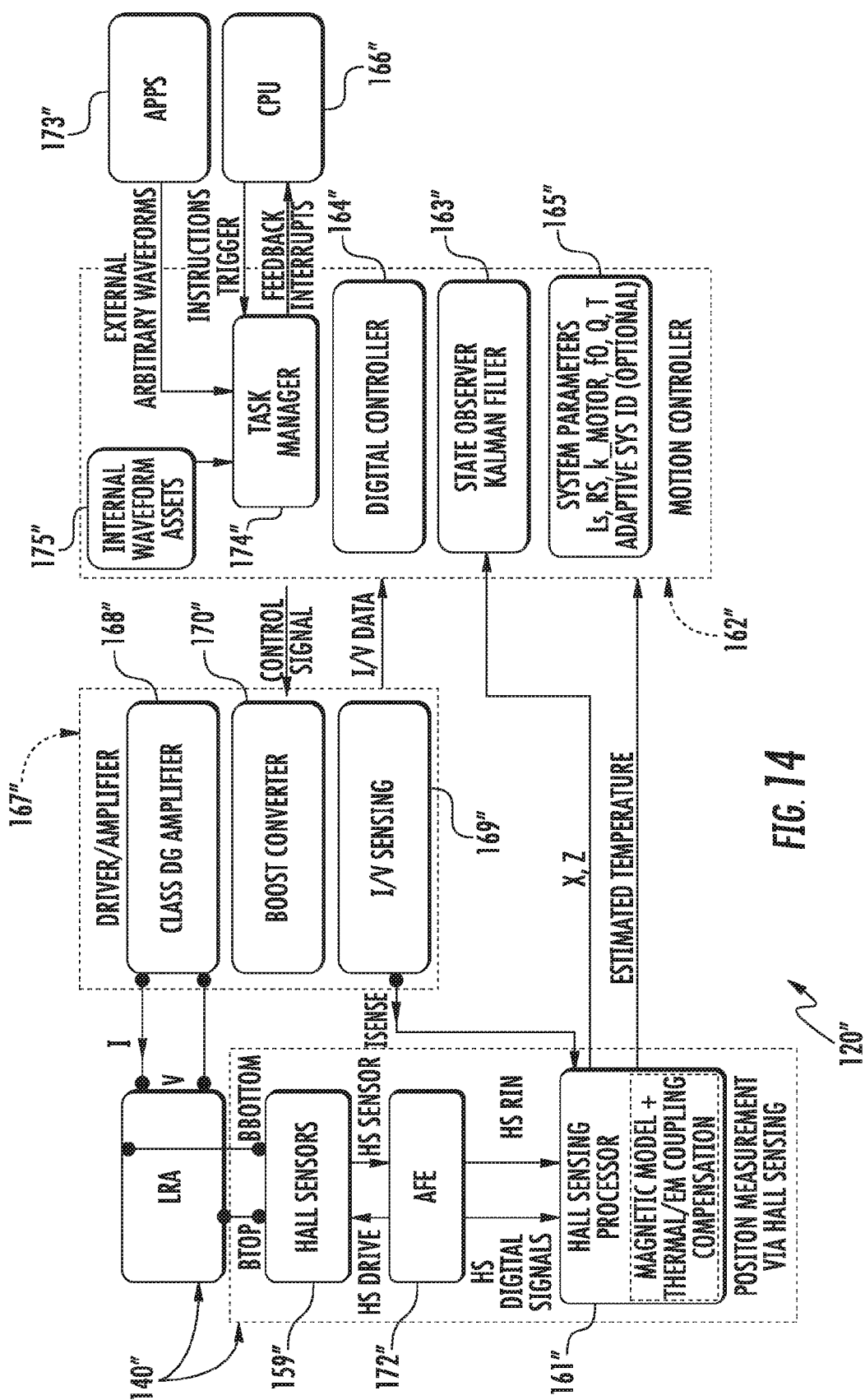
FIG. 14 is a schematic diagram of a closed-loop architecture in accordance with an embodiment.

Referring now to FIG. 14, a schematic diagram of a closed-loop architecture in accordance with an embodiment is illustrated. The electronic device 120" includes a haptic actuator 140" that may be in the form of a linear resonant actuator (LRA), for example, and includes a field member and permanent magnets as described above. The haptic actuator 140" includes spaced apart magnetic sensors 159" on or carried within the housing of the haptic actuator.

With respect to position measurement via magnetic field sensing, e.g. Hall Effect sensing, the magnetic field sensors or Hall Effect sensors 159" each varies its output voltage based upon, for example, proportional to the sensed magnetic field and its current source. The Hall sensor (HS) analog front end (AFE) 172" drives the Hall sensors 159" by way of current sources followed by signal conditioning (offset correction, LPF, MUX) of its outputs followed by digitization (analog-to-digital converter (ADC)). A Hall Effect sensor processor 161" estimates motions under various orientations (x, z, rotation, etc.) from the Hall sensor data and based upon the magnetic model of the haptic actuator 140". The Hall Effect sensor processor 161" also compensates for thermal effects, EM couplings from coils, and nonlinearities, for example. The Hall Effect sensor processor 161" may also compensate for other and/or additional factors.

A motion controller 162" controls the motion of the haptic actuator 140" based upon closed-loop feedback to follow the desired motion defined by the external commands (e.g. coming from OS/third party apps supervised by the CPU) or internally stored pre-set waveforms, for example, as described above.

The state observer 163" estimates the states of the haptic actuator 140" (such as, for example, displacement, velocity, current, etc.) from the noisy sensed data (position measured by Hall sensing, I, V, etc.). A digital controller 164" generates optimum drive signals (voltage and/or current) and drives the haptic actuator 140" to follow the desired motion.

System parameters 165" are stored in the memory of the motion controller 162" and can be updated adaptively internally (by the controller itself using adaptive control algorithms or externally (by a CPU 166" via offline calibration).

These updated parameters are fed into the state observer 163" (e.g. a Kalman filter) and the digital controller 164" to improve performance. Applications 173" provide external arbitrary waveforms to a task manager 174", for example, based upon the context of the application, Internal waveforms 175", for example, stored in a memory, may also be provided to the task manager 174" for generation of a control signal.

A driver/amplifier circuit 167" amplifiers the output of the digital controller 164" to drive the haptic actuator 140", for example, via a class DG amplifier 168". The driver/amplifier circuit 167" monitors and senses the electrical input (current and voltage) to the haptic actuator 140" via I/V sensing circuitry 169". The sensed current and voltage can be used and feed the Hall sensing processor 161" and motion controller 162" to estimate temperature, coil resistance, EM coupling and back electromotive force (EMF), for example. The driver/amplifier circuit 167" also includes a boost converter 170".

Figure 15:
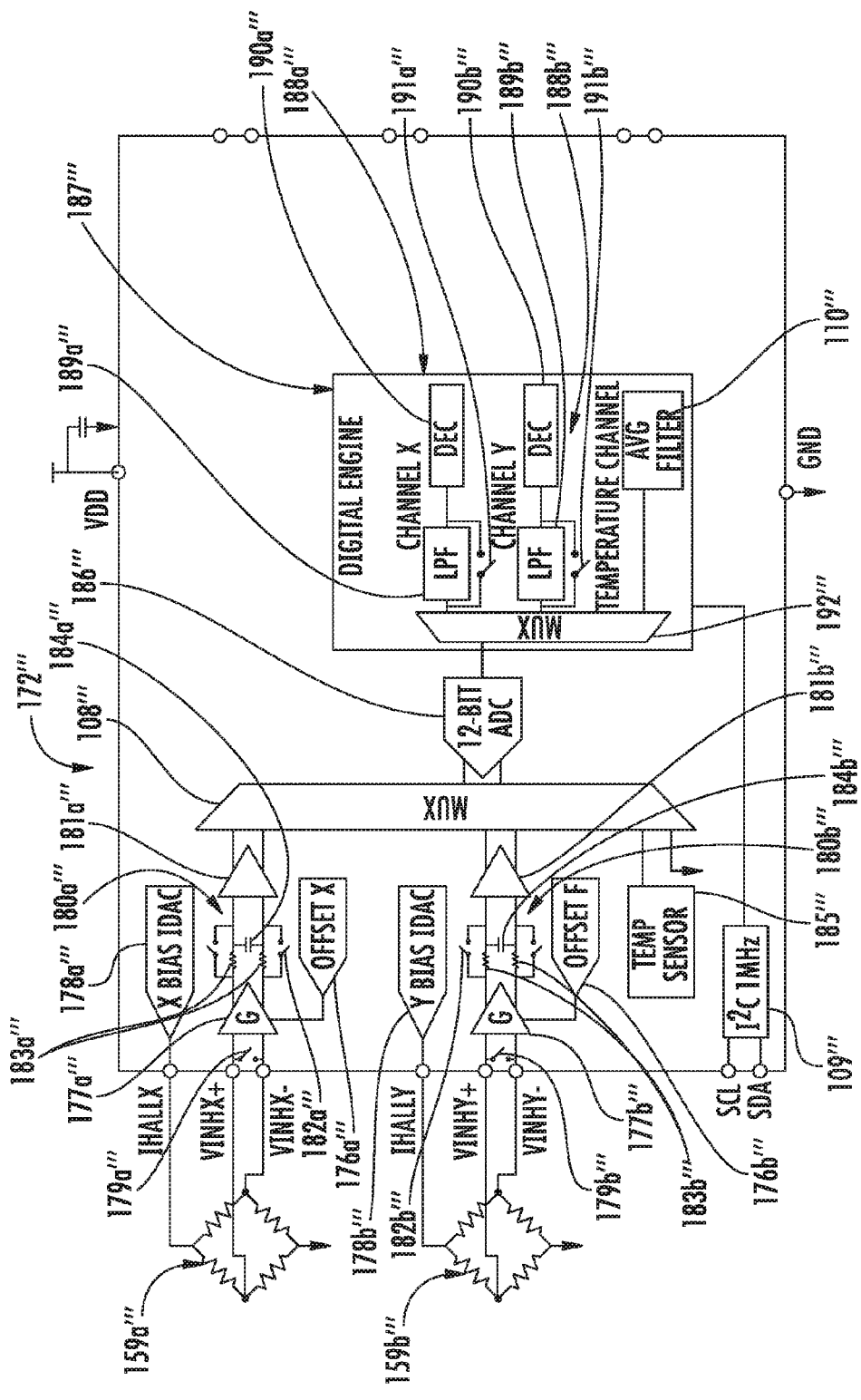
FIG. 15 is detailed schematic diagram of an exemplary analog front end of an electronic device in accordance with an embodiment.

Further details of an embodiment of an analog front end 172''' will now be described with respect to FIG. 15. Hall Effect sensors 159a''' and 159b''' sense x and y directional movement. Offset correction 176a''', 176n''' is provided as an input to respective amplifiers 177a''', 177b'''. Respective programmable current sources 178a''', 178b''' that may include digital-to-analog converters are coupled to the Hall Effect sensors 159a''', 159b'''. Bypass switches 179a''', 179b''' are coupled between inputs of the amplifiers 177a''', 177b''' and the Hall Effect sensors 159a''', 159b'''.

An anti-aliasing filter 180a''', 180b''' is coupled between the output of the amplifier 177a''', 177b''' and a programmable amplifier 181a''', 181b'''. Each anti-aliasing filter 180a''', 180b''' includes a pair of switches 182a''', a pair of parallel coupled resistors 183a''', 183b''', and a capacitor 184a''', 184b''' therebetween. Outputs of each programmable amplifier 181a''', 181b''' are provided to a multiplexor 108'''. A temperature sensor 185''' is also provided as an input to the multiplexor 108'''.

An analog-to-digital converter (ADC) 186''' is coupled to the output of the multiplexor 108'''. The ADC 186''' may be 12-bit ADC, for example. The output of the ADC 186''' is provided to a digital engine 187''', and more particularly, a multiplexor 192'''. The digital engine 187''' includes respective (for each channel) FIR low pass filters 188a''', 188b''' coupled to the multiplexor 192'''. Each FIR low pass filter 188a''', 188b''' includes a low pass filter circuit 189a''', 189b''' coupled to a decoder 190a''', 190b'''. Each FIR low pass filter 188a''', 188b''' includes a bypass switch 191a''', 191b'''. An I²C bus 109''' (SCL, SDA), for example, operating at 1 MHz, is coupled to the digital engine 187'''. An average filter 110''', for example, for temperature compensation (i.e., a temperature compensation channel) is also coupled to the multiplexor 192'''.

Figure 16:
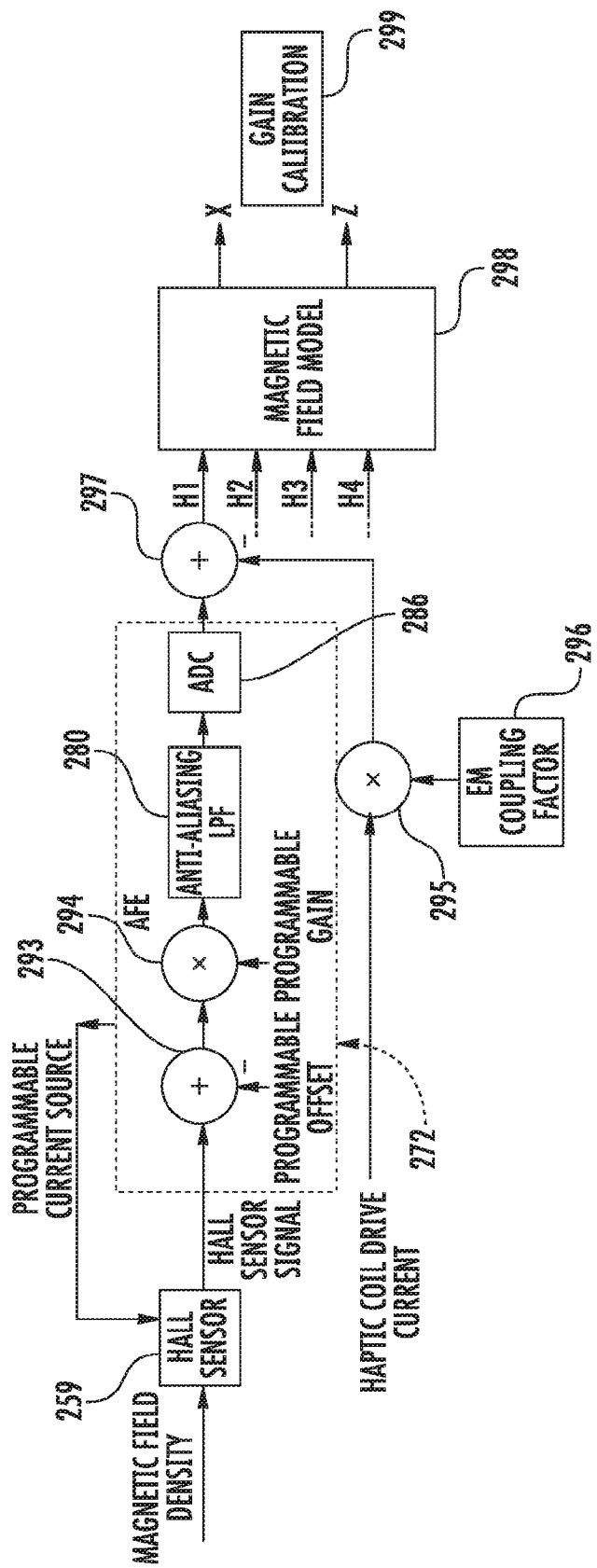
FIG. 16 is a schematic block diagram illustrating sensor signal processing in accordance with an embodiment.

Further sensor signal processing steps will now be described with respect to FIG. 16. As described above, magnetic field density is provided to the Hall Effect sensor (s) 259, which provide, as an output, a Hall Effect sensor signal to the analog front end 272. Current from the programmable current source is provided to the Hall Effect sensor 259.

With respect to offset correction, the offset is adjusted, for example, at an offset correction node 293 (e.g., a summing node) to obtain zero output at the haptic actuator neutral position. The offset correction is based upon a full dynamic range of the ADC 286.

With respect to gain, the gain is adjusted at a gain adjustment node 294 (e.g. a multiplier), to maintain the signal within the dynamic range of the ADC 286 at maximum displacement of the haptic actuator. An anti-aliasing low pass filter 280, for example, as described above, is coupled between the gain adjustment node 294 and the ADC 286.

With respect to EM coupling, the response of the magnetic field sensors to the coil electromagnet is measured with a calibration procedure, which will be described in further detail below. A test may be performed using a DC current at the sub-assembly level (e.g. coil and magnetic field sensor only), or with transient current at the module level (permanent magnets respond to transients slowly because of inertia). During normal operation, subtracted coil current is multiplied by an EM coupling factor 296 from the scaled magnetic field sensor output at the EM coupling factor multiplier 295, the output of which is provided to a summing node 297 which sums the output of the EM coupling factor multiplier and the output of the ADC 286. This removes the electromagnet signal leaving only the permanent magnet signal.

With respect to haptic actuator motion, a model of magnetic field variation 298 with haptic actuator motion in different directions is used to separate motion components. For relatively small z-axis motion the H1 and H3 may be subtracted to obtain an x-axis position, and a ration of H1 and H3 may be used to infer the z-axis position, as will be appreciated by those skilled in the art. A calibrated gain 299 is output.

With respect to position calibration, a ratio of DAC counts to μm of motion is determined. This value is used to relate DAC output to the physical position. For gain calibration (at node 294), the ratio of μm of motion to the applied DC current is determined. This value is used to establish the correct control loop gain.

The self-calibration process will now be described. It should be noted that reference readings of the magnetic field sensors (e.g., Hall effect sensors) are relative to end stop locations of the haptic actuator and a polynomial model of the non-linear response of the haptic actuator is given by $$V_H = \Sigma a_i x^i$$

For calibration, the haptic actuator is driven at resonance and slightly into the end stops. The output of the magnetic field sensors are recorded. The values sensed by the magnetic field sensors are fit to a sine wave (neglecting the clipped region) and optimized to find the terms of the polynomial. The scale is normalized to the clipping point. It should be understood by those skilled in the art that the haptic actuator can be initially calibrated, for example, in the factory, and then re-calibrated in the field.

Figure 17:
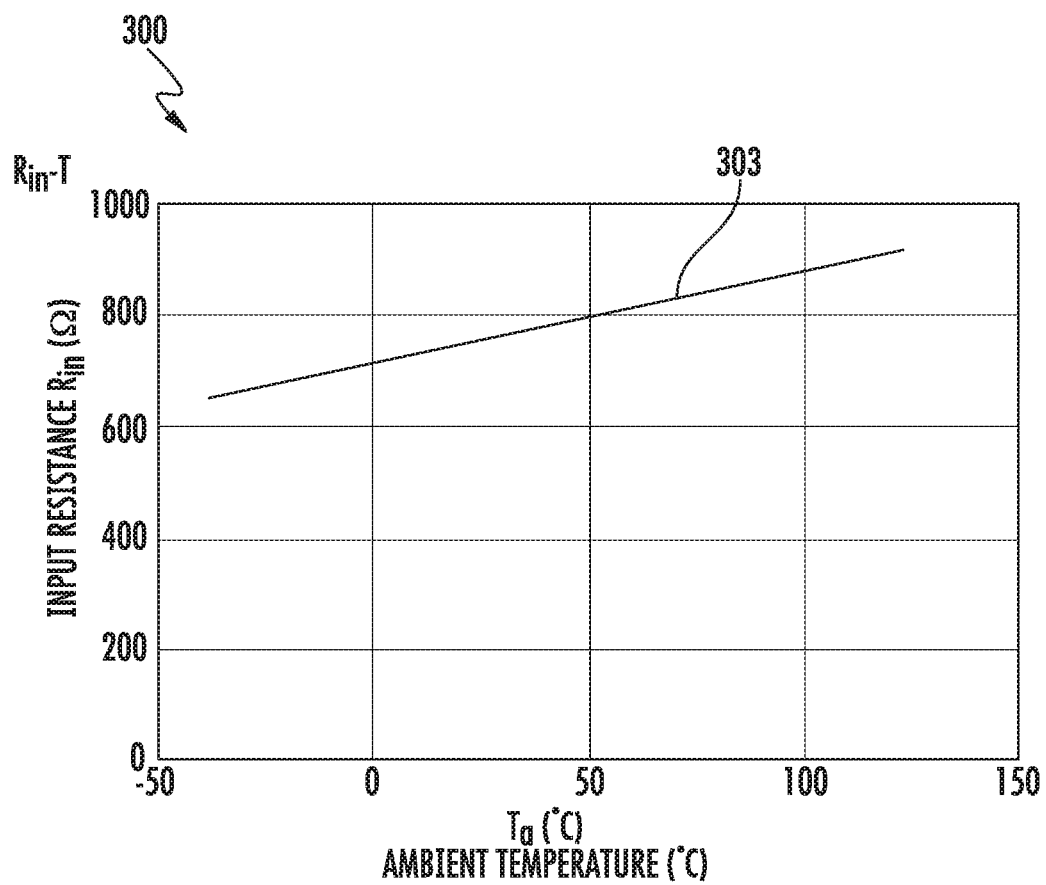
FIG. 17 is a graph of input resistance versus ambient temperature during temperature compensation using an electronic device in accordance with an embodiment.
Figure 18:
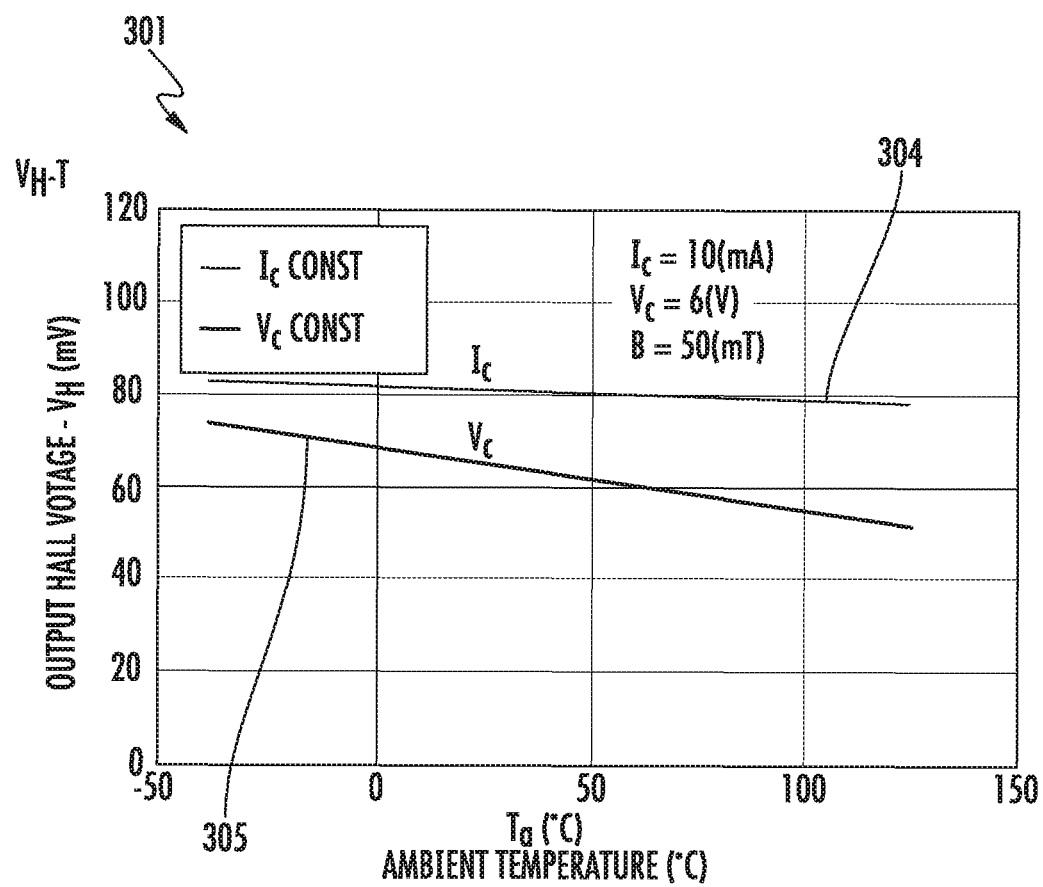
FIG. 18 is a graph of output Hall sensor voltage versus ambient temperature during temperature compensation using an electronic device in accordance with an embodiment.
Figure 19:
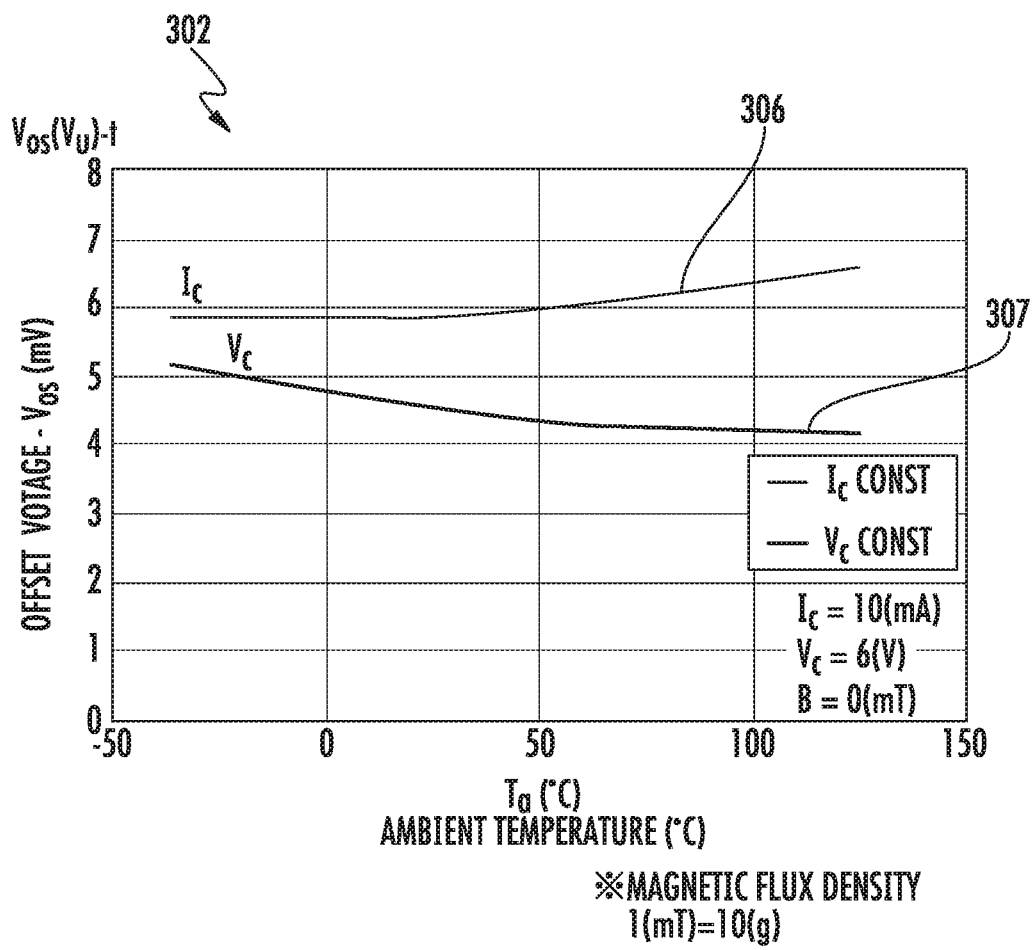
FIG. 19 is a graph of offset voltage versus ambient temperature during temperature compensation using an electronic device in accordance with an embodiment.

Further details of temperature compensation will now be described. Initially, the temperature of the driver (permanent magnet) and/or Hall Effect sensors is read. Corrections for lines gain variation are applied. Corrections for offset with the polynomial model, as described above, are made or removed with chopping, as will be appreciated by those skilled in the art. Corrections for magnetic temperature are then made. The graphs 300, 301, and 302 in FIGS. 17-19 illustrate input resistance versus ambient temperature (303), output Hall sensor voltage versus ambient temperature ($I_c$ 304, $V_c$ 305; both constant), and offset voltage versus ambient temperature ($I_c$ 306, $V_c$ 307; both constant).

Still further, similar to the embodiments described above, and in the embodiments described in FIGS. 11-13, the haptic actuator may include a permanent magnet carried by the actuator housing, and the field member may include one or more coils that cooperate with the permanent magnet. In other words, the permanent magnet is stationary (i.e., carried by the actuator housing) and the coils, as part of the field member are moving (i.e., connected to the mass). Of course, there may be any number of coils and/or permanent magnets. For embodiments where the coils are moving, additional magnets, for example, that are relatively small in size, may be added to the field member (similar to a barcode) and may be monitored or tracked by one or more of the magnetic sensors.

Alternatively or additionally, one or more magnetic sensors may be mounted on the field member 150 and wirelessly communicate sensed data. It should also be understood that the spaced apart magnetic sensors may also be the driver magnets. In other words, the permanent magnets 152 that are part of the field member may also operate or be configured to perform the functions of the magnetic sensors 159 (i.e. there are not separate magnets for driving the field member and for sensing the movement of the field member.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a haptic actuator comprising
   an actuator housing,
   a plurality of coils carried within the actuator housing,
   a field member movable within the actuator housing responsive to the plurality of coils, and
   a plurality of spaced apart Hall Effect sensors carried within the actuator housing between the plurality of coils and configured to sense a temperature of the field member; and
   a controller coupled to the haptic actuator and configured to
   determine a temperature of the field member based upon the plurality of spaced apart Hall Effect sensors, and
   drive the haptic actuator based upon the temperature.

2. The electronic device of claim 1 wherein the controller is configured to determine the temperature based upon an output resistance of the plurality of spaced apart Hall Effect sensors.

3. The electronic device of claim 1 wherein the controller comprises a closed-loop controller.

4. The electronic device of claim 1 wherein the controller is configured to sense a drive current of the haptic actuator, and drive the haptic actuator based upon the drive current.

5. The electronic device of claim 4 wherein the controller is configured to
   determine a calibration of the haptic actuator based upon drive current and the sensed temperature of the field member, and
   drive the haptic actuator in a closed-loop configuration based upon the calibration of the haptic actuator and at least one reference pattern of movement of the field member.

6. The electronic device of claim 5 wherein the at least one reference pattern of movement comprises a plurality of different reference patterns of movement, each corresponding to a desired one of a plurality of different operating modes of haptic feedback.

7. The electronic device of claim 6 wherein each of the plurality of different reference patterns of movement has a different drive waveform associated therewith.

8. The electronic device of claim 1 further comprising a flexible circuit substrate carrying the plurality of spaced apart Hall Effect sensors within the actuator housing.

9. The electronic device of claim 1 wherein the controller comprises a closed-loop controller configured to determine the temperature of the field member and an actuator driver carried within the actuator housing and configured to drive the haptic actuator based upon the temperature.

10. The electronic device of claim 1 further comprising a power amplifier coupled between the controller and the haptic actuator.

11. The electronic device of claim 1 further comprising a position sensor configured to sense a position of the field member during movement thereof, and wherein the controller is configured to drive the haptic actuator based upon the position of the field member.

12. An electronic device comprising:
    a haptic actuator comprising
    an actuator housing,
    at least one first coil carried within the actuator housing,
    at least one second coil carried within the actuator housing,
    a field member movable within the actuator housing between the at least one first and second coils and responsive thereto, and
    a plurality of spaced apart Hall Effect sensors carried within the actuator housing between the at least one first and second coils and configured to sense motion of the field member; and
    a controller coupled to the haptic actuator and configured to drive the haptic actuator based upon the sensed motion of the field member from the plurality of spaced apart Hall Effect sensors.

13. The electronic device of claim 12 wherein the controller comprises a closed-loop controller.

14. The electronic device of claim 12 wherein the controller is configured to sense a drive current of the haptic actuator, and driving the haptic actuator based upon the drive current.

15. The electronic device of claim 14 wherein the controller is configured to
    determine a calibration of the haptic actuator based upon drive current, and
    drive the haptic actuator in a closed-loop configuration based upon the calibration of the haptic actuator and at least one reference pattern of movement of the field member.

16. The electronic device of claim 15 wherein the at least one reference pattern of movement comprises a plurality of different reference patterns of movement, each corresponding to a desired one of a plurality of different operating modes of haptic feedback.

17. The electronic device of claim 12 further comprising a flexible circuit substrate carrying the plurality of spaced apart Hall Effect sensors within the actuator housing.

18. A method of controlling a haptic actuator comprising an actuator housing, a plurality of coils carried within the actuator housing, a field member movable within the actuator housing responsive to the at least one coil, the method comprising:
    using a controller coupled to the haptic actuator for
    determining a temperature of the field member based upon a plurality of spaced apart Hall Effect sensors carried within the actuator housing between the plurality of coils and configured to sense a temperature of the field member, and driving the haptic actuator based upon the temperature.

19. The method of claim 18 wherein the controller is used to determine the temperature based upon an output resistance of the plurality of spaced apart Hall Effect sensors.

20. The method of claim 18 wherein the controller comprises a closed-loop controller.

21. The method of claim 18 wherein the controller is used to sense a drive current of the haptic actuator, and drive the haptic actuator based upon the drive current.

22. The method of claim 21 wherein the controller is used to determine a calibration of the haptic actuator based upon drive current and the sensed temperature of the field member, and drive the haptic actuator in a closed-loop configuration based upon the calibration of the haptic actuator and at least one reference pattern of movement of the field member.

\* \* \* \* \*